(12) United States Patent
McKenney et al.

(10) Patent No.: US 6,418,517 B1
(45) Date of Patent: Jul. 9, 2002

(54) OPTIMIZED FUNCTION EXECUTION FOR A MULTIPROCESSOR COMPUTER SYSTEM

(75) Inventors: Paul E. McKenney; Chandrasekhar Pulmarasetti, both of Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/001,570

(22) Filed: Dec. 31, 1997

Related U.S. Application Data

(60) Provisional application No. 60/057,223, filed on Aug. 29, 1997.

(51) Int. Cl.[7] .............................................. G06F 12/00
(52) U.S. Cl. ........................ 711/151; 711/148; 711/152; 711/153; 707/104
(58) Field of Search .......................... 707/104; 710/16; 711/147, 148, 151–153

(56) References Cited

U.S. PATENT DOCUMENTS

| | | | |
|---|---|---|---|
| 5,185,861 A | | 2/1993 | Valencia |
| 5,191,652 A | * | 3/1993 | Dias et al. .................. 395/200 |
| 5,261,053 A | * | 11/1993 | Valencia ..................... 395/200 |
| 5,295,258 A | * | 3/1994 | Jewett et al. ............... 395/575 |
| 5,303,369 A | * | 4/1994 | Borcherding et al. ....... 395/650 |
| 5,341,491 A | * | 8/1994 | Ramanujan ................. 395/425 |
| 5,428,781 A | * | 6/1995 | Duault et al. ............... 709/102 |
| 5,485,593 A | * | 1/1996 | Baker .......................... 709/216 |
| 5,584,017 A | * | 12/1996 | Pierce et al. ................ 395/473 |
| 5,592,671 A | * | 1/1997 | Hirayama .................... 395/674 |
| 5,808,607 A | * | 9/1998 | Brady et al. ................ 345/327 |
| 5,815,651 A | * | 9/1998 | Litt ........................ 395/182.08 |
| 5,872,972 A | * | 2/1999 | Boland et al. .............. 395/672 |
| 5,900,020 A | * | 5/1999 | Safranek et al. ............ 711/167 |
| 5,968,114 A | * | 10/1999 | Wentka et al. .............. 709/100 |

* cited by examiner

Primary Examiner—Matthew Kim
Assistant Examiner—Pierre M. Vital
(74) Attorney, Agent, or Firm—Klarquist Sparkman Campbell Leigh & Whinston LLP

(57) ABSTRACT

A method for scheduling functions for execution immediately or later in time by the scheduling processor or another processor of a shared memory multiprocessor computer system such as a NUMA machine. Associated with each of the multiple processors is a data structure for scheduling the execution of specified functions by the processor. These multiple data structures with associated locks allow for simultaneous access by processors to their data structures and thereby avoid the bottleneck inherent in the prior approach of providing only a single, global data structure for all processors. In addition, the method allows any processor to call a scheduling function to add a specified function to the data structure of any of the processors. Processor loads are balanced by moving scheduled specified functions from one processor to another. Scheduled functions can also be moved from one processor to another to allow a processor to be taken offline for service.

31 Claims, 11 Drawing Sheets

OPTIMIZED FUNCTION EXECUTION FOR A MULTIPROCESSOR COMPUTER SYSTEM

RELATED APPLICATION DATA

This application is based on U.S. Provisional Application Ser. No. 60/057,223, filed Aug. 29, 1997.

FIELD OF THE INVENTION

This invention relates generally to computer operating systems. More particularly, this invention relates to the scheduling by an operating system of functions for execution on specified processors or specified nodes of a multiprocessor computer system.

BACKGROUND OF THE INVENTION

Multiprocessor computers by definition contain multiple processors (also referred to as CPUs) that can execute multiple parts of a computer program or multiple distinct programs simultaneously, in a manner known as parallel computing. In general, multiprocessor computers execute multithreaded-programs or single-threaded programs faster than conventional single processor computers, such as personal computers (PCs), that must execute programs sequentially. The actual performance advantage is a function of a number of factors, including the degree to which parts of a multithreaded-program or multiple distinct programs can be executed in parallel and the architecture of the particular multiprocessor computer at hand.

Multiprocessor computers may be classified by how they share information among the processors. Shared-memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared-memory multiprocessor computers may further be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared memory systems are often called non-uniform memory access (NUMA) machines. By contrast, in centralized shared-memory computers, the memory is physically in one location. Centralized shared-memory computers are called uniform memory access (UMA) machines because the memory is equidistant in time from each of the processors. Both forms of memory organization typically use high-speed cache memory in conjunction with main memory to reduce execution time.

Multiprocessor computers with distributed shared memory are often organized into multiple nodes with one or more processors per node. The nodes interface with each other through a memory-interconnect network by using a protocol, such as the protocol described in the Scalable Coherent Interface (SCI)(IEEE 1596). UMA machines, in contrast, typically use a bus for interconnecting all of the processors.

Further information on multiprocessor computer systems in general and NUMA machines in particular can be found in a number of works including *Computer Architecture: A Quantitative Approach* ($2^{nd}$ Ed. 1996), by D. Patterson and J. Hennessy, which is hereby incorporated by reference.

A single operating system typically controls the operation of a multinode multiprocessor computer with distributed shared memory. Examples of suitable operating systems include UNIX-based operating systems such as DYNIX/ptx, BSD, SVR4, UnixWare, PC UNIX, etc. For general information on such operating systems, see Bach, M. J., *The Design of the UNIX Operating System*, Prentice-Hall, 1986; Vahalia, U., *Unix Internals: The New Frontier*, Prentice-Hall, 1996; McKusick, M., et al., *The Design and Implementation of the 4.4 BSD Operating System*, Addison-Wesley, 1996, which are all hereby incorporated by reference.

One purpose of such an operating system is to schedule the execution of functions that perform periodic tasks. These periodic tasks include retransmitting dropped network packets, scheduling and managing memory, monitoring devices to avoid losing interrupts, polling devices that do not support interrupts, and remote but immediate execution of a function on a specified CPU or node. This scheduling is often done through a timeout mechanism such as the UNIX timeout system call that defers a specified function's execution for a specified time or a remote execution mechanism that specifies on which CPU or node a function will be immediately executed.

Prior operating systems for UMA multiprocessor computers have used a number of timeout mechanisms that defer a function's execution a specified number of system clock ticks. A relevant mechanism to this invention includes a global priority queue data structure in the centralized memory, such as shown in FIG. 1. This data structure groups timeout handlers (timeout cells (tocells) A0, D1, F0, etc., that represent specified functions that are scheduled for execution) into "buckets." All tocells in a given "future events" bucket are connected in a circular doubly-linked list and are scheduled to execute, or "fire," on the same system clock tick, modulo the number of buckets. The array of buckets is indexed by the lower order bits of a system variable tonow that is incremented on each clock tick. All the tocells in the bucket after the one indexed by tonow are scheduled to fire on the next clock tick, modulo the number of buckets. On that next clock tick, these tocells are added to the end of the group of tocells in the "current events" bucket, where they are processed by any processor (CPU) that is currently available. The tocell is identified by letter (which represents a pointer to the memory containing the cell), and the associated number indicates the number of clock ticks still remaining after the tocell is placed in the current events bucket. If the number is zero, then processing the tocell will cause it to fire. If the number is nonzero, such as two or three, the CPU processing the tocell will place it in the proper future events bucket two or three ahead of the one pointed to by the index, with the number reset to zero. Thus in FIG. 1 when tocell C2 is placed on the current events list, it will not fire but will be moved two future events buckets ahead, to the bucket that contains D1 and E0, and its count set to zero.

Access to the global priority queue is controlled by a global "gate" (also known as a "lock") a system variable that is set by a CPU to indicate that the queue is currently being accessed. This lock ensures that only one CPU at a time can access the future events buckets through the timeout system call to add or remove tocells, thereby preventing data corruption that would otherwise occur if multiple CPUs attempted to schedule functions simultaneously.

Although this timeout mechanism has served adequately for UMA machines, it has a number of drawbacks. The use of a global lock results in poor system behavior during overload, i.e., when multiple CPUs are simultaneously attempting to schedule functions. The global lock also severely limits the scalability of the timeout mechanism. That is, the performance of the timeout mechanism degrades as the number of CPUs in the computer increases. And in certain circumstances, a sequence of interrupts can cause multiple instances of a scheduled specified function for a tocell to be executing concurrently. This can be avoided only by using a much more complicated locking design for the lock.

An objective of the invention, therefore, is to provide a method and means for scheduling functions for execution on a multiprocessor computer without the delay inherent in prior approaches. Another objective of the invention is to provide such a method and means that permits functions to be scheduled for execution on a specified CPU (which could be the scheduling CPU or another CPU) or on a specified node of a multiprocessor computer. Yet another objective of the invention is to provide such a method and means that balances CPU loads by directing the execution of functions from overloaded CPUs to available CPUs of a multiprocessor computer.

SUMMARY OF THE INVENTION

In accordance with the invention, a shared memory multiprocessor computer includes, for each of the processors, an associated data structure stored in shared memory for scheduling the execution of specified functions by the processor. A scheduling function responsive to a request by a processor adds a specified function to a processor's data structure. The use of separate data structures for each processor avoids the delay inherent in the prior approach of using a single, global data structure for scheduling all functions for execution.

In one embodiment of the invention, the scheduling function is responsive to a request by a processor to add the specified function to the data structure of a processor other than the requesting processor. In another embodiment of the invention, the multiprocessor computer includes a multiple of nodes each of which has multiple processors. In this embodiment the scheduling function is responsive to a request by a processor to add the specified function to the data structure of a processor on a specified node.

The processor's data structure may take many forms. In a preferred embodiment of the invention, the data structure has first and second data structures. The first data structure includes a field containing a list of second data structures identifying specified functions to be immediately executed by the processor. The second data structure exists for each scheduled specified and includes a first field identifying the first data structure for association and a second field identifying a specified function for execution.

In methods associated with the invention, specified functions can be moved from one CPU to another if a CPU becomes unavailable or overloaded.

The foregoing and other objectives, features, and advantages of the invention will become more apparent from the following detailed description of a preferred embodiment which proceeds with reference to the accompanying drawings.

DETAILED DESCRIPTION

System Overview

Figure 2:
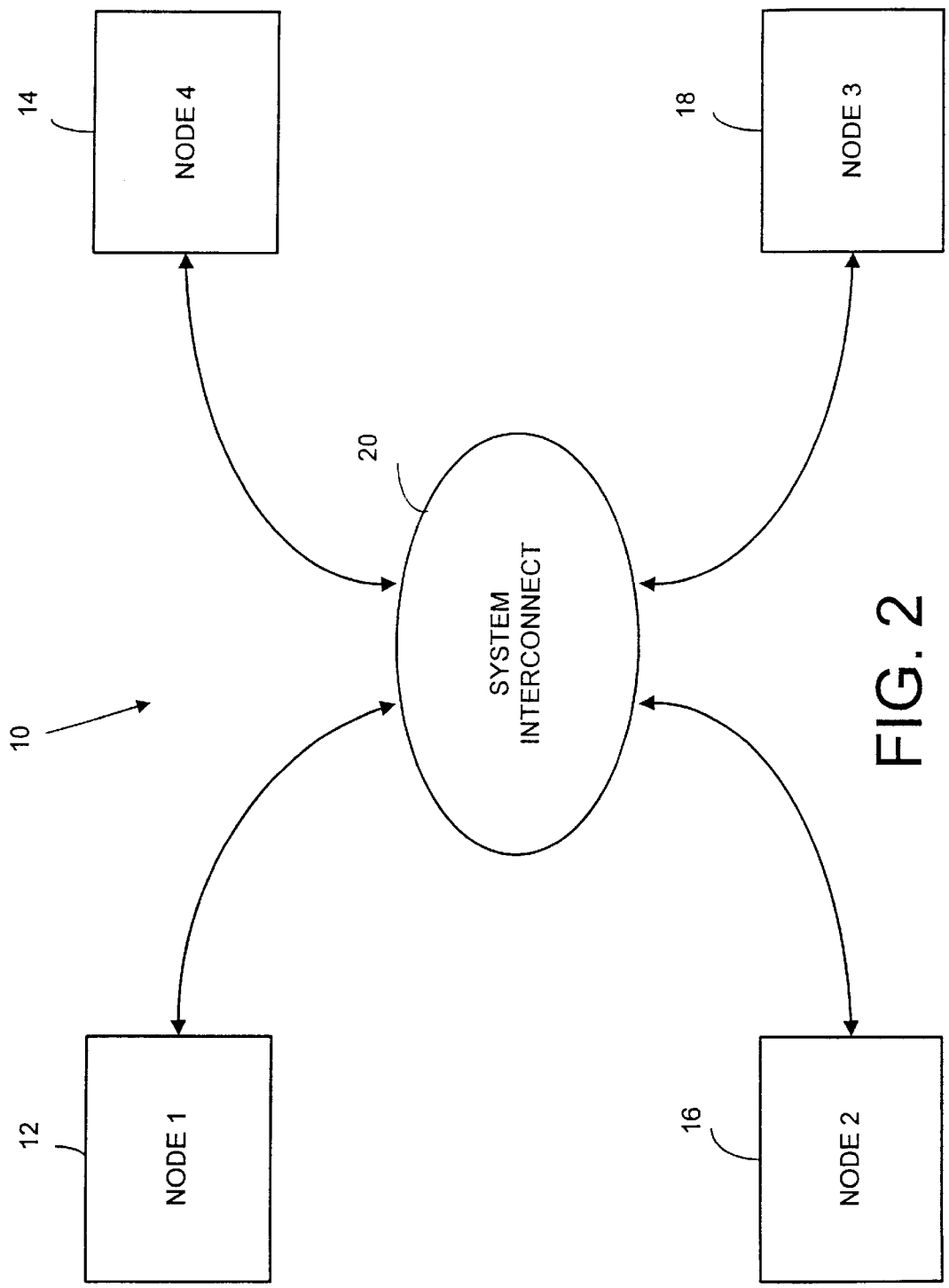
FIG. 2 is a block diagram of a multinode multiprocessor computer system with a system interconnect coupling the nodes together.

FIG. 2 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12, 14, 16, and 18 are shown connected by a system interconnect 20 (i.e., a network) that permits any node to communicate with any other node. Specifically, the purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including IEEE Std 1596-1992 (Aug. 2, 1993) and Multiprocessor Interconnection Using SCI, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12, 14, 16, and 18 such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, Computer Sciences Technical Report #1058, University of Wisconsin-Madison, which is hereby incorporated by reference.

Node Overview

Figure 3:
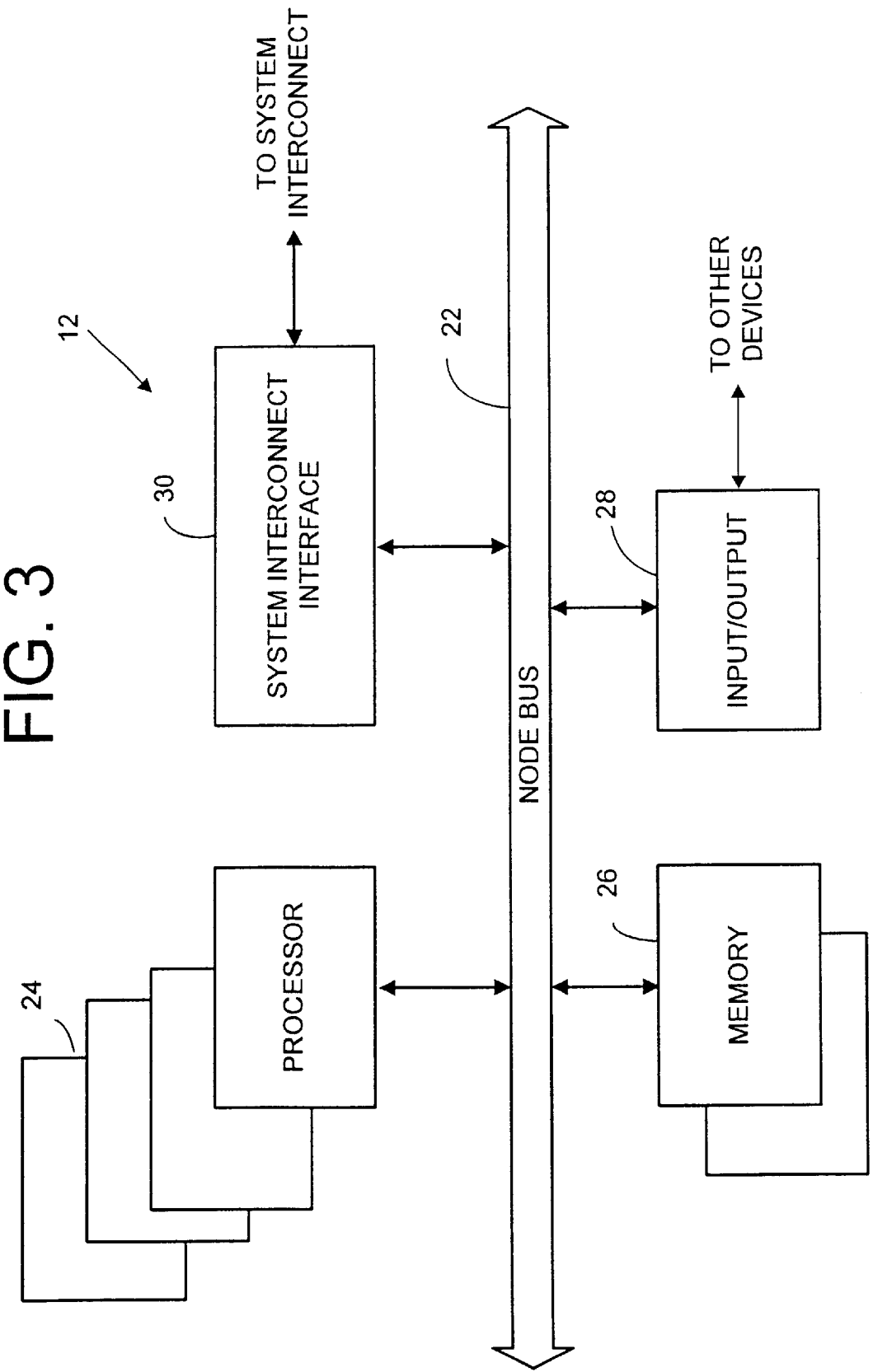
FIG. 3 is a block diagram of one of the nodes of the computer system of FIG. 2.

A block diagram of node 12 on system 10 is shown in FIG. 3. The node includes a conventional symmetrical multiprocessor (SMP) node bus 22 for connecting multiple data processors 24 to local memory 26. For clarity, nodes 12, 14, 16, and 18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc.

To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to directly access data stored on another node. The interface 30 also contains a remote cache in the present embodiment, although this combination is not required for the invention. The remote cache could also be separate from the system interconnect interface.

Operating System Overview

Figure 4:
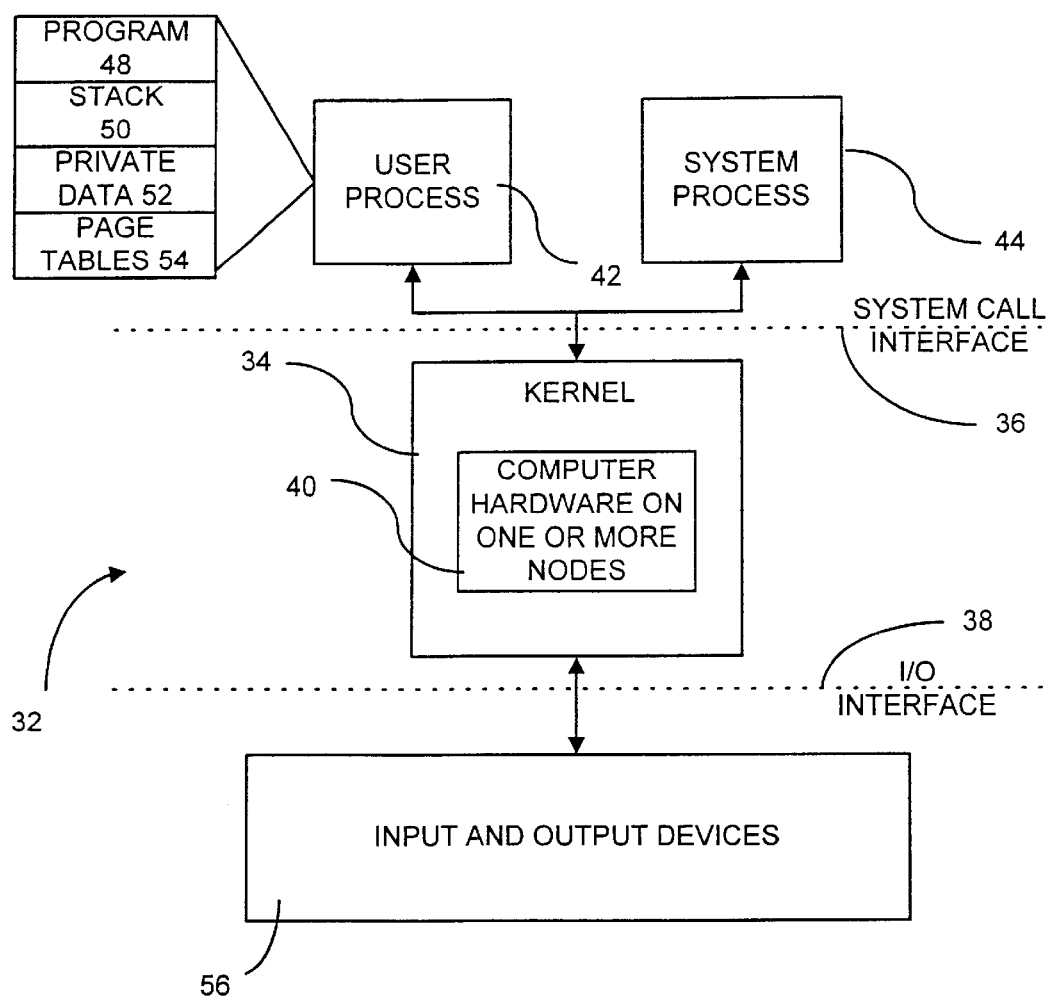
FIG. 4 is a block diagram of how an operating system for the system of FIG. 2 operates with multiple processes and input and output devices.

FIG. 4 shows an operating system 32 for computer system 10, which includes a kernel 34, a system call interface 36 and an I/O interface 38. The same operating system environment exists on the other nodes. The illustrated operating system is a UNIX-based operating system, although other operating systems may also be used. Kernel 34 (which is the heart of operating system 32) is a program stored in memory 26 on one or more nodes. Memory 26, processors 24, and other hardware shown in FIG. 3 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CD ROM, etc.), a shared memory segment, a file, a process, a CPU, etc.

Requests are generated by one or more processes, such as user process 42 and system process 44 that run on computer system 10. User process 42 includes a part of a program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single and multi-level page tables are represented by page table 54. Process 44 includes a similar environment to that of process 42. Although two processes are shown, any number of processes may be run at one time on the node. The processes make requests to kernel 34 through system calls which are passed to the kernel by system call interface 36. Processes execute in parallel to the extent they can be run concurrently on the different processors of system 10.

Kernel 34 accesses I/O devices 56 through I/O interface 38. For example, if process 42 requests information from a disk drive (not shown) included within I/O devices 56, process 42 makes a system call to operating system 32. Operating system 32 uses I/O interface 38 to retrieve the information from the disk drive and returns the information to user process 42.

In a preferred embodiment of the invention, operating system 32 provides several functions (also known as primitives) that are used in system processes for scheduling the execution of other functions. These include primitives for deferred function execution (in the form of a timeout mechanism) and primitives for immediate function execution (in the form of a remote execution mechanism). These primitives work with unique data structures to schedule and reschedule functions efficiently in the manner described below.

The Timeout Mechanism

Figure 5:
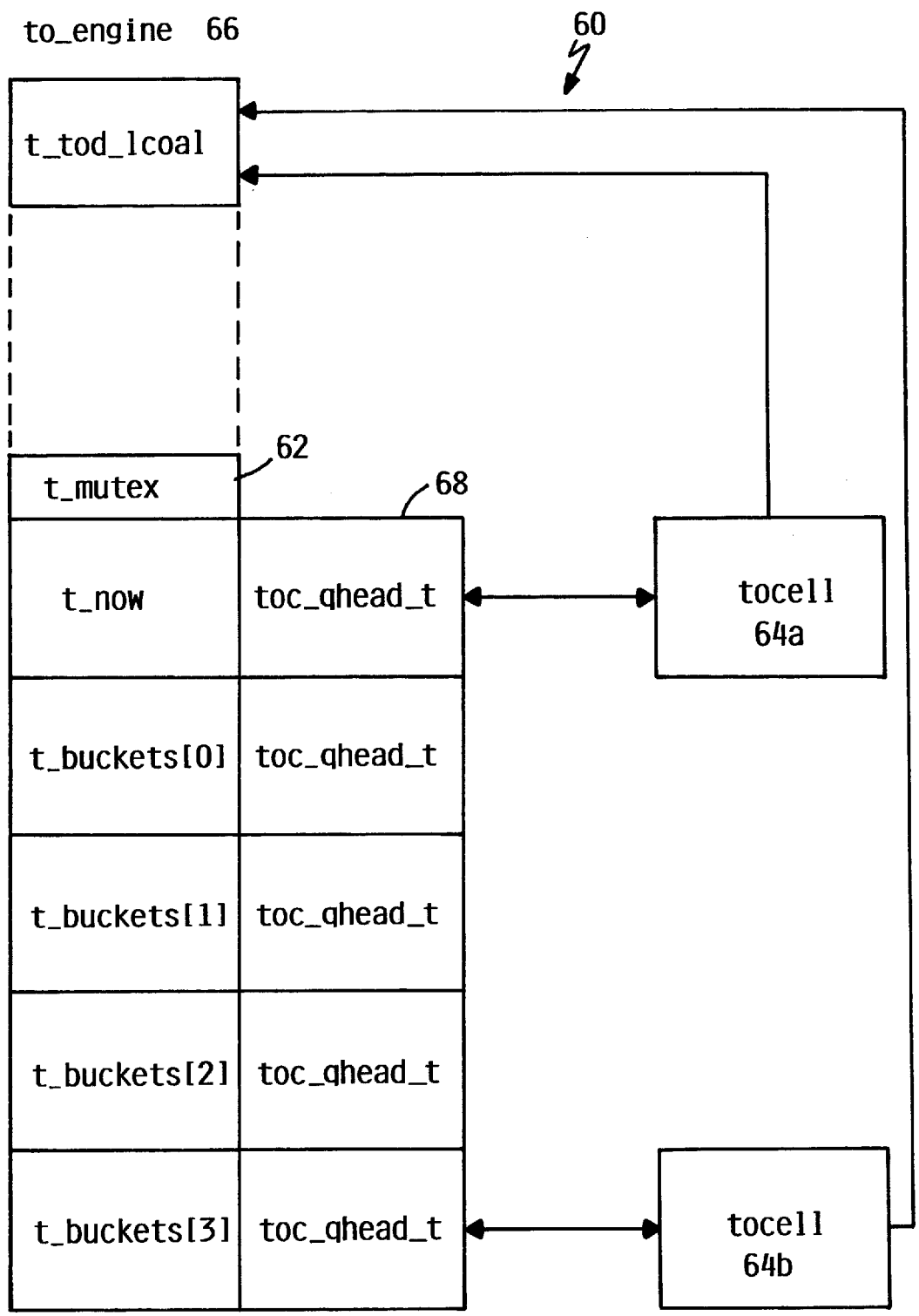
FIG. 5 is a block diagram of an overall data structure used in a timeout mechanism in accordance with the invention for scheduling functions on a multiprocessor computer.

FIG. 5 is a block diagram of an overall data structure 60 used in a timeout mechanism in accordance with the invention for scheduling functions on a multiprocessor computer such as system 10. Although superficially similar in appearance to the data structure of FIG. 1, data structure 60 differs significantly in the makeup of its constituent data structures 64, 66, and 68 and their interaction in system 10. Unlike the global data structure of FIG. 1, there is no global data structure or global lock. Instead, data structure 60 is replicated by operating system 32 on a per-CPU basis, so that there is at least one such associated data structure and lock 62 for each CPU in computer system 10. And unlike the data structure of FIG. 1, data structures 60 are constructed to accept tocells (which include functions to be scheduled for execution) that identify individual CPUs and nodes in computer system 10, thereby permitting interaction between a data structure 60 and an unassociated CPU. Data structure 60 may be replicated by operating system 32 on a per-node basis in an alternative embodiment.

Each CPU in system 10 operates its data structure 60 largely independent of the other CPUs. If a CPU has no reason to concern itself with another CPU's tocells, then there is no interaction with another CPU's data structure. Contention for lock 62 thus rarely arises since only the CPU associated with the data structure typically accesses it, and the delay inherent with the prior timeout mechanism is avoided.

However, interaction is permitted (and encouraged) to occur in the following circumstances. One CPU may need to modify the scheduling of a function that has been scheduled by another CPU for execution. One CPU may need to schedule a function for execution by another CPU by placing a tocell 64 in the other CPU's data structure 60. Or a load imbalance may develop among the CPUs: one CPU is overloaded with functions to execute while another CPU is idle. Rectifying the load imbalance requires moving tocells from one CPU's data structure 60 to another CPU's data structure 60. This move is accomplished by changing the tocell's indication (such as field entry) of which CPU it is queued on. When the CPU indication is changed, the tocell's indication of its lock 62 must also change. To prevent data corruption, locks for both the source CPU (where the tocell was queued for execution) and the destination CPU (where the tocell is now queued for execution) must be held when updating the indication. A second way to prevent data corruption is to treat the updating of the indication as an implicit dropping of the lock.

Constituent Data Structures for the Timeout Mechanism

Figure 6:
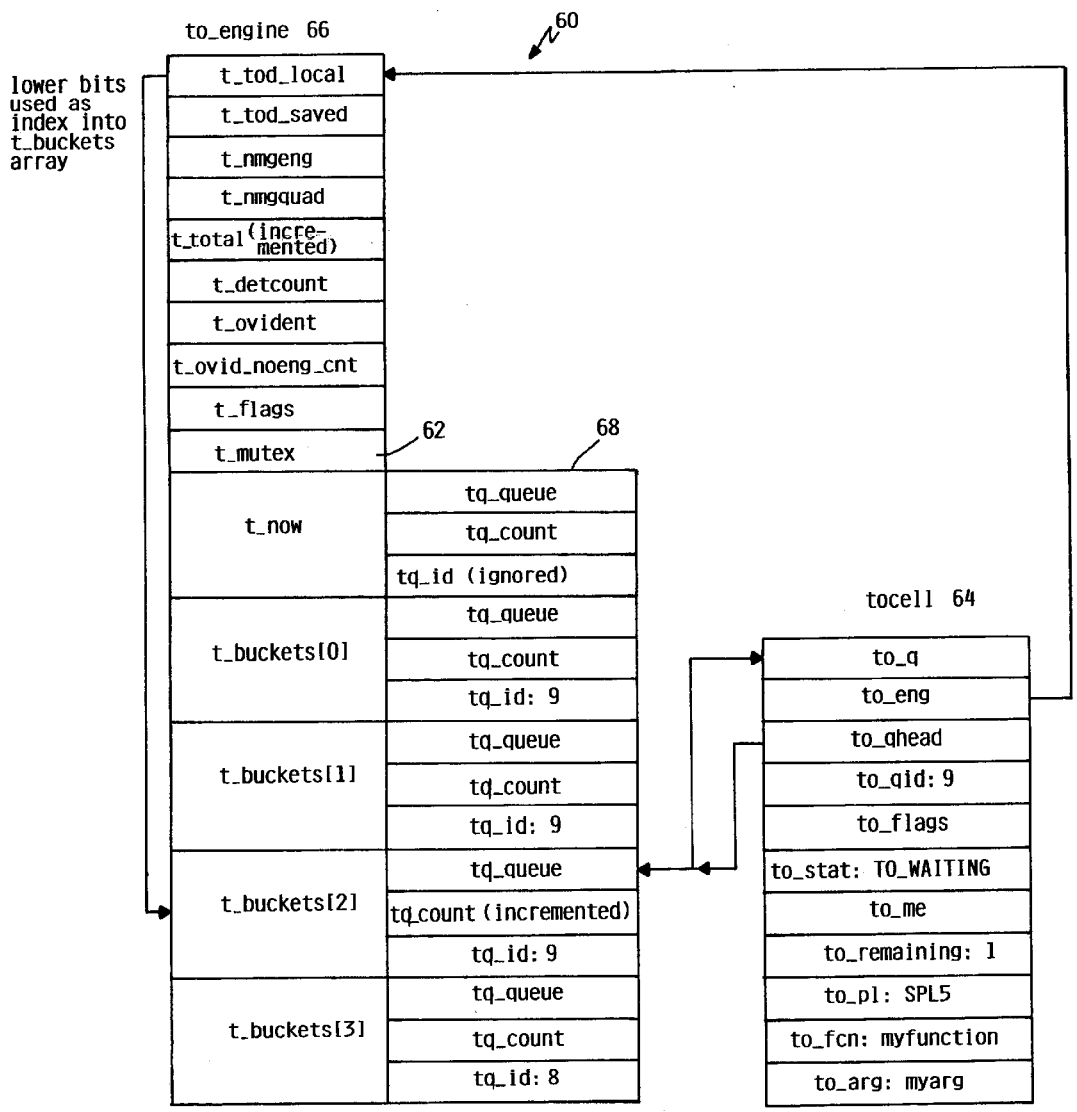
FIG. 6 is a more detailed diagram of the data structure of FIG. 5, showing the fields of the constituent data structures and a tocell in a future events bucket.

To enable each of the multiple CPUs in system 10 to access the data structures 60 of other CPUs, a number of novel constituent data structures within data structure 60 are provided in accordance with the invention. These are shown in FIG. 6 and include one or more timeout cells 64, a timeout_eng data structure 66, and a toc_qhead data structure 68.

The Timeout Cell (tocell)

Table 1 is a list of the significant fields in a preferred embodiment of a tocell data structure 64:

TABLE 1

| Field name | Definition |
| --- | --- |
| to_q | A pair of pointer fields used to arrange tocells in a circular doubly-linked list. |
| to_eng | Pointer to the per-CPU queuing data structure 60. |
| to_qhead | Pointer to the bucket header that this tocell is on. If the tocell has been moved to the t_now list (see Table 4), then this field points to the last bucket header that the tocell was on. In this case, the to_qid field will no longer match the t_qid field of that bucket header. This mismatch allows to_untimeout() to determine which list the tocell is on so that it can decrement the count of the correct list. |
| to_qid | Generation ID that determines whether tocell is on t_now list or on one of the bucket lists. |
| to_flags | Flags that track affinity, deferred deletion, deferred posting, deferred untimeout (see Table 3 below). |
| to_stat | Current state of tocell (see Table 2 below). |
| to_me | Engine (CPU/node) on which timeout handler is to execute next. This is set just before invoking the tocell's handler, and when doing a to_timeout() for a tocell whose handler is currently executing. |
| to_remaining | Number of ticks that will remain next time softclock() sees this tocell. If the tocell's handler is executing, and the tocell was subject to a to_timeout() after the handler started executing, then this field is used to hold the time delay from the deferred to_timeout() call. |
| to_pl | Interrupt priority level at which this tocell is to execute. |
| to_fcn | Function that softclock() is to invoke when this timeout fires. |
| to_arg | Argument to be passed to to_fcn. |

The to_stat field in Table 1, which gives the current state of the tocell, can assume one of a number of values:

TABLE 2

| Value Name | Definition |
| --- | --- |
| TO_NOQ | The tocell is "not on a queue". It has been newly created by to_create() or removed from a queue by to_untimeout(). A cell in this state may be posted with to_timeout(), unposted with to_untimeout(), or freed with to_destroy(). |
| TO_POSTING | The tocell is in the process of being posted (transient state). |
| TO_WAITING | The tocell is on the queue waiting for its time to expire. It may not be posted with to_timeout() without first either firing or being to_untimeout()ed. |
| TO_FIRED | The tocell has fired, its handler function has been executed, and it may now be reposted with to_timeout(), unposted with to_untimeout(), or freed with to_destroy(). |
| TO_INPROGRESS | The tocell has fired, but its handler is still executing. It may now be reposted with to_timeout(), "removed" with to_untimeout(), or freed with to_destroy(). These actions will all be deferred until the handler completes execution. |

The to_flags field in Table 1 can also assume a number of values:

TABLE 3

| Value Class | Value Name | Definition |
| --- | --- | --- |
| Migration type | TO_MIGRATE | Migrate to different CPU/node if current one goes offline or becomes overloaded. |
| | TO_ERRMIGRATE | Invoke handler immediately with error indication if current CPU/node goes offline. Refuse to migrate in case of CPU/node overload. |

TABLE 3-continued

| Value Class | Value Name | Definition |
| --- | --- | --- |
| | TO_EVAPMIGRATE | Remove tocell from circular doubly-linked list if current CPU/node goes offline (as if to untimeout() had removed it). Refuse to migrate in case of CPU/node overload. |
| | TO_NOMIGRATE | Refuse to migrate. The presence of this type of tocell on an CPU's list will prevent that CPU from going offline. |
| Affinity type | TO_ENG | The tocell is affinitied to (i.e., associated with) a specific CPU. |
| | TO_QUAD | The tocell is affinitied to (i.e., associated with) a specific node. |
| | 0 | None of the above. |
| Deferred action | TO_DEFDEL | When this tocell's handler finishes executing, this tocell will be deleted (as in to_destroy()). |
| | TO_DEFCB | When this tocell's handler finishes executing, this tocell will be reposted. The delay time is kept in to_remaining, the CPU number is kept in to_eng and to_me, and the affinity parameters are kept in to_flags. This means that, in a TO_DEFCB tocell, these fields reflect the state of the next, not the current handler. This state is used to prevent multiple concurrent handlers executing for the same tocell. |
| | TO_DEFUNTIMEOUT | When this tocell's handler finishes executing, this tocell will not be reposted, even if a to_timeout() is invoked on it between now and then. This state is used to prevent multiple concurrent handlers executing for the same tocell. |
| | 0 | None of the above. |
| Global state | TO_NORM | The tocell has been queued normally, and has not be moved due to CPU overload or offline. |
| | TO_OFFL | The tocell has been moved at least once, and the last move was due to the CPU going offline. |
| | TO_OVLD | The tocell has been moved at least once, and the last move was due to CPU overload. |

The timeout_eng Data Structure

Figure 1:
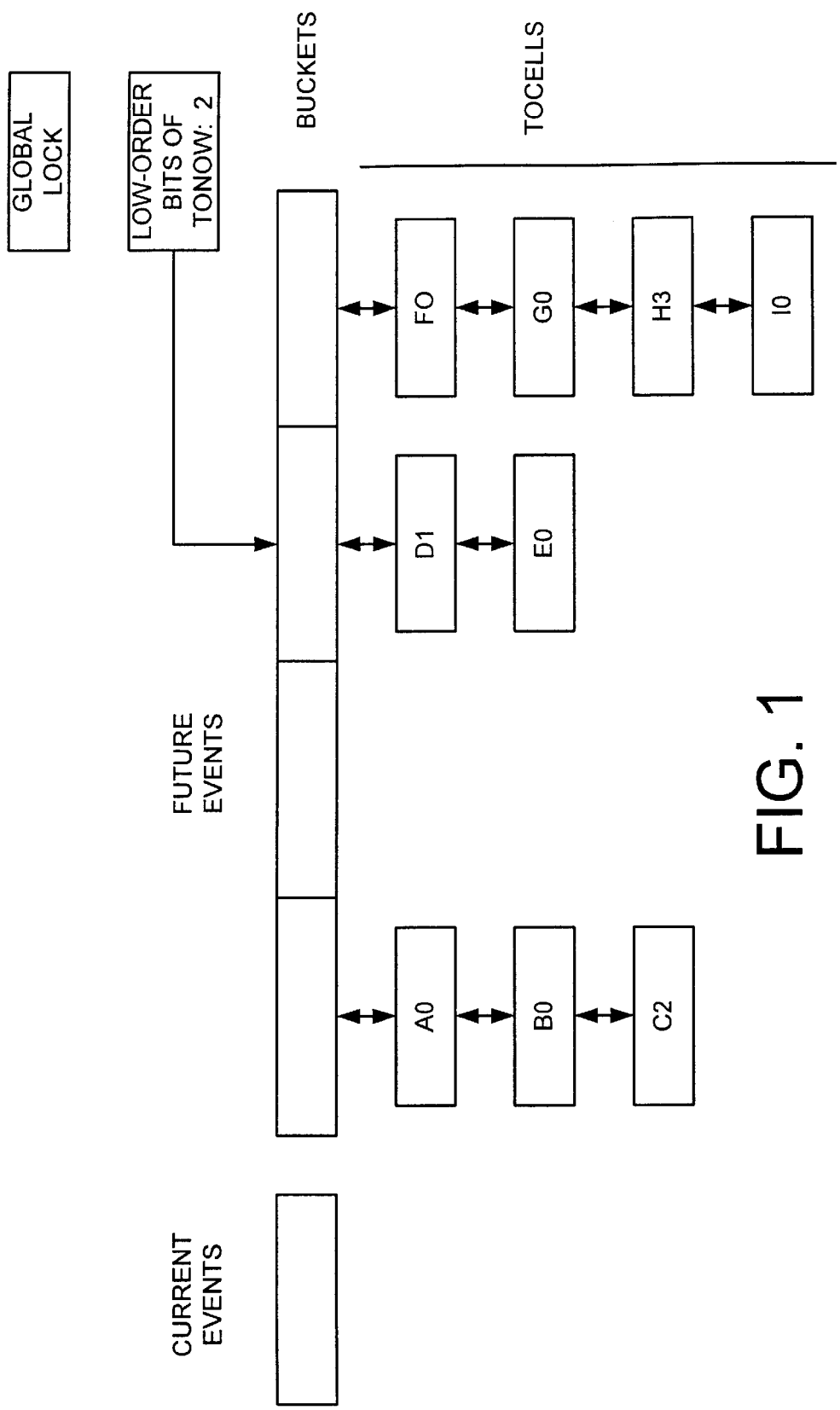
FIG. 1 is a block diagram of a data structure used in a prior art timeout mechanism.

Data structure 60, being implemented on a per-CPU basis, is more complex than the prior system-wide structure of FIG. 1. Certain information about the state of the data structure must be tracked to efficiently use these data structures as a group, such as the number of tocells per data structure. The timeout_eng data structure 66 within data structure 60 tracks these states. Its fields are defined in Table 4 below:

TABLE 4

| Field name | Definition |
| --- | --- |
| t_tod_local | Current CPU's estimate of the number of clock ticks since boot. |
| t_tod_saved | Time (measured in ticks since boot) that current CPU last synchronized its t_tod_local with the global system time. This will normally be the last time this CPU came online |
| t_nmgeng | Count of TO_NOMIGRATE tocells affinitied to this CPU |
| t_nmgquad | Count of TO_NOMIGRATE tocells affinitied to this node |
| t_total | Count of all tocells queued for this CPU including those counted by t_nmgeng and t_nmgquad. |

TABLE 4-continued

| Field name | Definition |
| --- | --- |
| t_defcount | Count of "deferred" actions, typically deferred to_timeout() invocations that are awaiting the current handler for their tocell to complete. |
| t_ovldcnt | Count of number of times that load-balancing was performed. |
| t_ovld_noeng—cnt | Count of number of times that load-balancing was thwarted due to this CPU being the least loaded of the CPUs, despite its being overloaded |
| t_flags | TE_REFUSE bit, if set, indicates that this CPU is rejecting timeouts due to being offline or in the process of going offline. |
| t_mutex | Lock (also referred to as a mutex) that protects all the fields in this structure as well as all timeouts queued on this structure or that reference this structure with their to_eng pointers (this field has a togate_t structure, which is a mutex data structure). |
| t_now (a toc_qhead_t structure) | Circular doubly-linked list of all tocells that are ready to be invoked (this field has a tocqhead_t structure). This list is also referred to as the current events bucket. |
| t_buckets[] (a to_cqhead_t structure) | Array of TO_MAX buckets, each of which is a circular doubly-linked like of tocells. TO_MAX is a symbol that indicates how many buckets each CPU keeps. |

The toc_qhead_t Data Structure

The toc_qhead_t structures 68 are t_now and t_buckets[ ] in Table 4. Each has the following fields (note the "tq_" prefixes on its field names):

TABLE 5

| Field name | Definition |
| --- | --- |
| tq_queue | Header for the circular doubly-linked list. |
| tq_count | Number of tocells currently on this list. |
| tq_id | Number of times since boot that this list has been moved to the t_now list. This field is compared to the to_qid field when untimeouting -- if the fields match, this tocell is still in a future events bucket (a t_bucket) of data structure 60, otherwise it is in the current events bucket (t_now list). This information is required in order to determine which t_count field the to_untimeout() should decrement. Note that the tq_id field of the t_now lists are never actually referenced. They are present only to simplify the software. |

FIG. 6 is a more detailed view of data structure 60, showing the pertinent fields described above for data structures 64, 66, and 68.

Selected Operations on the Timeout Data Structures

Step-by-step procedures for interaction between the CPUs of system 10 and their data structures 60 are described below.

Acquiring the Lock

In the global priority queue data structure of FIG. 1, there is a single, global lock. Acquiring that single lock gives a CPU free rein to modify any of the timeout-related data structures. However, the penalty for this simplicity is the noted severe performance limitations because only one CPU can perform timeout-related operations at one time. Furthermore, a single cache line containing the lock becomes a memory "hot spot", and shuttling this single cache line back and forth between all of the CPUs of computer system 10 imposes substantial overhead. This overhead can result in "congestive collapse" under extreme timeout overload—all of the CPUs end up spending most of their time waiting to acquire the lock, and very little actual work is accomplished. The overhead becomes so great that in some instances the multiple CPUs of system 10 may accomplish less work than a single-CPU system.

This invention provides a solution to this problem by replicating data structure 60 on a per-CPU basis, as described above, and by including a separate lock 62 for each CPU as shown in FIGS. 5 and 6. Thus in the common case where a timeout is scheduled via a to_timeout( ) primitive and then fires normally, all processing for that timeout occurs on one CPU, thereby enjoying excellent cache locality and resulting high performance. Extreme overload situations that would lead to very poor performance with the prior timeout mechanism run very quickly on the new mechanism, consuming very little CPU time and memory bandwidth.

However, the previously simple operation of acquiring the lock is now more complex because there are multiple data structures 60 to consider. When operating on a tocell, a CPU must now look at the cell's to_eng pointer to determine the cell's current locking allegiance. Instead of acquiring a global lock when operating on a tocell pointed to by "tp", the CPU must now acquire the lock given by "tp—>to_eng—> t_mutex". The to_eng pointer determines a given tocell's locking allegiance.

Moreover, it is entirely possible that the tocell's locking allegiance may change while a CPU is attempting to acquire the tocell's lock. In this case, the CPU would find that the lock that it had acquired was no longer the correct one for operating on this tocell. Therefore, once the CPU has acquired the lock, it must check that the tocell's allegiance has not changed. It the tocell's allegiance has changed, the CPU must release the lock it just acquired and acquire the lock that the tocell now has allegiance to. Once this new lock has been acquired, the CPU must recheck the tocell's allegiance. In the preferred embodiment it does so in the following manner:

TABLE 6

1. Obtain a pointer to the current value of tp->to_eng->t_mutex, and place this pointer into a variable named mutexp.
2. Acquire the lock pointed to by mutexp
3. While tp->to_eng->t_mutex is not equal to mutexp, repeat the following steps:
   a) Release the lock pointed to by mutexp.
   b) Obtain a pointer to the current value of tp >to_eng->t_mutex, and place this pointer into a variable named mutexp.
   c) Acquire the lock pointed to by mutexp.

At the end of this process, the CPU is guaranteed to hold the correct lock, since it is forbidden to change a tocell's to_eng field without holding that tocell's lock. Since the CPU currently holds the correct lock, that lock will remain correct until this CPU changes it or until some time after this CPU releases the lock.

Scheduling a Function for Deferred Execution

Primitives for scheduling a function for execution on computer system 10 must be able to recognize individual CPUs and nodes. In the present embodiment, three such scheduling functions are provided: to_timeout( ), to_timeout_quad( ), and to_timeouteng( ) (they could, if desired, be combined into one). These primitives do the following. First, they select a CPU to queue a tocell on. The to_timeout( ) primitive selects by default the CPU that is actually doing/requesting the to_timeout( ) operation, while to_timeout_eng( ) and to_timeout_quad( ) allow the user to select a CPU other than the requesting processor or a specified node to execute the tocell handler. Second, they provide for selection of an alternative CPU to execute the tocell handler if the first CPU is unavailable. The to_timeout_quad( ) and to_timeout_eng( ) primitives allow the user to specify what happens if the selected CPU or node is unable to execute the timeout handler (due either to the CPU being placed offline or to the CPU becoming overloaded). The to_timeout( ) primitive defaults to TO_MIGRATE if the current CPU goes offline or becomes overloaded. Third, they respond to situations where this tocell's handler is currently running; in particular, they must handle cases where a to_untimeout( ) primitive has been invoked on a tocell since its handler started running, and they must avoid generating multiple concurrently executing handlers for a given tocell.

When invoked by a CPU, these primitives go through the following steps to accomplish the above functions:

TABLE 7

1. Select a CPU:
    a) If a particular CPU is specified, select it that CPU and acquire its lock per table 6 (to avoid races, the lock must be acquired before checking the CPU, and dropped if the CPU is inappropriate).
    b) Otherwise, if a particular node is specified, select the CPU on that node with the fewest total tocells and acquire its lock (to avoid races, the lock must be acquired before checking the CPU, and dropped if the CPU is inappropriate).
    c) Otherwise, (no particular CPU or node is specified) select the CPU on the current (invoking) node with the fewest total tocells and acquire its lock (to avoid races, the lock must be acquired before checking the CPU, and dropped if the CPU is inappropriate).
    d) If no suitable CPU is available (for example, if a particular node is specified and all CPUs on that node are offline), then handle the tocell based on the affinity flags specified:
        i) TO_MIGRATE : Panic, invalid condition (there has to be at least one CPU available to allow the tocell to migrate to another CPU).
        ii) TO_NOMIGRATE: Panic. It is illegal to post TO_NOMIGRATE tocells unless steps have been taken to ensure that the specified CPU or node will remain online.
        iii) TO_ERRMIGRATE: Return failure
        iv) TO_EVAPMIGRATE: Do nothing, return success.
2. If a CPU has been successfully selected, increment CPU's t_defcount to prevent it from going offline
3. If needed, change the locking allegiance of the tocell to the selected CPU.
   Note that the tocell's handler might well be running. Changing locking allegiance requires:
    a) dropping the selected CPU's lock (t_mutex);
    b) acquiring the tocell's current CPU's lock (t_mutex);
    c) changing the tocell's to_eng pointer to point to the selected CPU's timeout_engine structure (which has the side-effect of unlocking the tocell);
    d) dropping the current CPU's lock (t_mutex), which previously guarded (but no longer guards) the tocell;
    e) reacquiring the selected CPU's lock t_mutex; and
    f) Repeating from step 3a until the tocell has the required locking allegiance.
4. If the tocell is not in the TO_DEFUNTIMEOUT state (i.e., it is not in the state where the handler is running, and a to_untimeout() has been invoked on it since the handler started), then queue the tocell as follows:
    a) Clear the affinity and state information from the to_flags field
    b) If the tocell's handler is not currently running:
        i) insert the tocell into the proper bucket, setting to_remaining to the proper amount;
        ii) increment the bucket's tq_count field; and
        iii) update the tocell's state:
            a) set the to_qhead field to point to the bucket into which the tocell was inserted;
            b) set the to_qid field to the bucket's tq_id field;
            c) set the to_stat field to TO_WAITING; and
            d) insert the specified affinity (TO_MIGRATE, TO_NOMIGRATE TO_ERRMIGRATE, or TO_EVAPMIGRATE) into the to_flags field
        iv) If this tocell is TO_NOMIGRATE and affinitied to a specific node, increment the t_nmgquad field
        v) If this tocell is TO_NOMIGRATE and affinitied to a specific engine, increment the t_nmgeng field.
        vi) Increment the t_total field (this field and the t_nmgeng and t_nmquad fields are used in load balancing).

TABLE 7-continued c) If the tocell's handler is currently running, defer requeuing of the tocell until the handler finishes:
        i) Set the to_me field to the ID of the selected CPU.
        ii) Insert TO_DEFCB and the desired affinity information into the to flags field.
        iii) Set the to_remaining field to the specified delay.
        iv) Increment the t_defcount field.
        v) The tocell will be inserted onto the proper list after it returns from its handler- the TO_DEFCB value in the flags field tells softclock() to do so.
5. Otherwise (if the tocell's to_flags field does contain a TO_DEFUNTIMEOUT), take no action
6. Decrement the t_defcount field, since by now if this tocell needs the CPU to stay online, then the increment of either the t_nmgquad or the t_nmgeng fields will keep it online.
7. Release the lock.

As a result of these steps, a tocell becomes associated with a specified CPU and its data structure 60.

Modifying a Scheduled Specified Function

It is possible to move tocells among CPUs by removing them from a source CPU's timeout_eng list structure, changing the tocells' fields, and then adding them to a destination CPU's timeout_eng list structure. This might be done, for example, to balance loads among the CPUs of system 10 more evenly.

Prior timeout mechanisms such as in FIG. 1 do not balance loads on the multiple CPUs since these mechanisms have only a single, system-wide data structure. These prior mechanisms do not maintain a count of the number of tocells in a given bucket because the timeout mechanism is not CPU specific—the next available CPU executes the tocell handler. However, the present invention, in utilizing a data structure 60 for each CPU, can balance loads among the CPUs so that no CPU is overloaded where other CPUs are underutilized.

To determine which CPUs need relief, the present timeout mechanism must know how many tocells are in each CPU's t_now list.

This means that primitives for modifying functions (such as scheduling functions to_untimeout( ) and to_tryuntimeout( ) in the present embodiment) must be able to determine which list the tocell is in.

The to_untimeout( ) and to_tryuntimeout( ) primitives execute the following steps to remove a specified tocell from its current data structure 60:

TABLE 8

1. Acquire the lock corresponding to a specified tocell using the procedure outlined in Table 6.
2. If the tocell is currently on a list:
    a) Remove it from that list (e.g., by changing pointers).
    b) If this tocell's to_qid field is equal to the tq_id field of the timeout_engine structure pointed to by this tocell's to_qhead pointer:
        i) Decrement the tq_count field referenced by the to_qhead pointer (i.e., decrement the count of the bucket header, since the tocell is still in its bucket).
        ii) Otherwise, decrement the tq_count field of the t_now list referenced by the to_eng pointer (i.e., decrement the count of the t_now header, since the tocell is on the t_now list and ready to fire).
    c) If this tocell is TO_NOMIGRATE and affinitied to a specific node, decrement the t_nmgquad field.
    d) If this tocell is TO_NOMIGRATE and affinitied to a specific CPU, decrement the t_nmgeng field.
    e) Decrement the t_total field (this field and the t_nmgeng and t_nmquad fields are used in load balancing).
    f) Set the to_stat field to TO_NOQ.

TABLE 8-continued g) Release lock (t_mutex) and return success (and don't execute the following steps).
3. Otherwise, if the tocell's to_stat field is not equal to TO_NOQ its handler must already be executing. Spin waiting for the handler to complete as shown in the following steps (in the case of to_untimeout()) or immediately return failure (in the case of to_tryuntimeout()):
    a) If the to_flags field does not already contain TO_DEFUNTMOUT, then this is the first to_untimeout() to execute on this tocell since the handler started executing. Do the following:
        i) If the to_flags field contains TO_DEFCB, then there has been a to_timeout() since the handler started executing. Cancel this by decrementing the t_defcount field referenced by the tocell's to_eng pointer.
        ii) Insert a TO_DEFUNTIMEOUT into the to_flags field. This value will overwrite any TO_DEFCB that might already have been there.
        iii) Set the to_remaining count to 1 to overload the to_remaining field. While the tocell was queued, this field indicated the number of additional ticks that the tocell must delay for. Now it indicates the number of to_untimeout() invocations that are spinning waiting for the handler to complete execution.
    b) Otherwise, there is already at least one to_untimeout() waiting for the handler to complete. Increment the to_remaining field.
    c) In either case, release the lock (t_mutex) and spin waiting for the handler to complete. Completion will be signaled by the value of the to_stat field changing from TO_INPROGRESS to either TO_FIRED (if we are the first to_untimeout() to notice that the handler finished) or TO_NOQ (if some other to_untimeout() beat us to it).
    d) Reacquire the t_mutex lock corresponding to this tocell using the procedure outlined in a previous section.
    e) Decrement the to_remaining field. If the result is zero, we are the last to_untimeout() to notice that the handler finished executing. If this is the case, clear the TO_DEFUNTIMEOUT from the to_flags field.
    f) If the to_stat field is TO_FIRED set it to TO_NOQ
    g) Return success
4. Otherwise, set the field to TO_NOQ release the t_mutex, and immediately return success.

Moving of Tocells from a Future Events Bucket to the Tonow List

In the prior-art timeout mechanism, the todclock() function moved tocells from the buckets to the tonow list. However, this is inefficient in the node-aware case, since the todclock() function executes only on one CPU per clock tick, and therefore, this single CPU would have to access and modify all of the other CPUs' timeout_eng structures. In doing this, it would incur expensive cache misses.

Therefore, this processing has been moved to the hardclock function in the present mechanism because hardclock() executes once per clock tick on each and every CPU. Therefore, it can operate on the local CPU's timeout_eng structure, and still be guaranteed that all such structures will be properly updated every tick.

The hardclock() timeout-related processing proceeds as follows:

TABLE 9

1. Copy the value of the global todtick variable into the local tod_now variable.
2. Acquire this CPU's t_mutex lock.
3 Repeat the following steps until the t_tod_local field is equal to tod_now (there will normally only be one pass through this loop, but there can be several if interrupts have been suppressed for a long time on this CPU, if the todtick() and hardclock() interrupts are out of phase with each other, or if suppression of interrupts delays the todclock() interrupt):

TABLE 9-continued a) If the t_bucket list indexed by the lower bits of t_tod_local is not empty, perform the following steps:
        i) Append the t_bucket list to the t_now list.
        ii) Add the value of the bucket's tq_count field to that of the t_now list.
        iii) Clear out the bucket: set its tq_queue to empty, zero its tq_count, and increment its tq_id.
    b) Increment the t_tod_local field.
4. If the t_now queue is not empty, release the t_mutex lock and send this CPU a software interrupt to cause the softclock() function to run. Otherwise, release the t_mutex lock.

Figure 7:
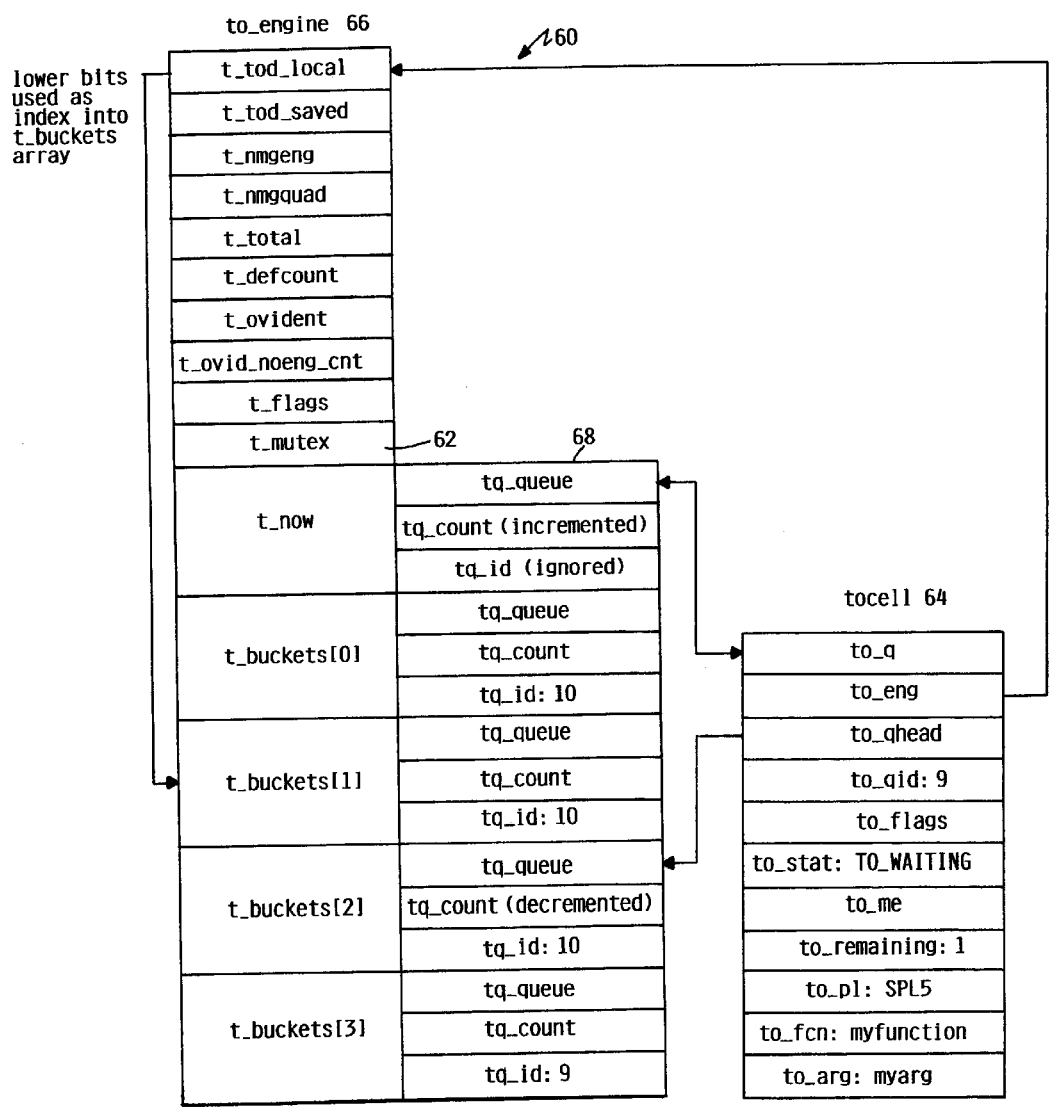
FIG. 7 is the same diagram of the data structure as FIG. 6, with the tocell now in the current events bucket.

When a tocell has been moved to the tonow list, its to_q pointer is changed to reflect the move. Compare the destination of the to_q pointer in FIG. 6, where it points to t_bucket[2], to its destination in FIG. 7, where it points to t_now.

Processing a Tocell

The softclock() primitive, well-known in the art, is used to process a tocell. The version of softclock() used in the prior timeout mechanism simply invokes a given tocell's handler and checks for deferred deletion. The present node-aware version, however, must check for deferred reposting and deferred untimeout of the tocell as well.

The softclock() function performs the following steps for each tocell on this CPU's t_now list:

TABLE 10

1. Acquire this CPU's t_mutex lock.
2. While there are tocells on this CPU's t_now queue, repeat the following steps:
    a) Remove the first tocell from the t_now queue.
    b) Decrement the t_now.tq_count field to reflect the fact that there is now one fewer tocells on the t_now queue.
    c) If its to_remaining field is nonzero, do the following steps:
        i) If the to_remaining field is greater than the number of t_buckets, subtract the number of buckets from to_remaining and requeue the tocell on the t_bucket whose contents were most recently moved t_now. Do the requeuing in accordance with step (4b) of the to_timeout() procedure (Table 7).
        ii) Otherwise, set the to_remaining field to zero and requeue the tocell on the t_bucket indicated by the previous value of the to_remaining field. Do the requeuing in accordance with step (4b) of the to_timeout() procedure (Table 7).
        iii) In either case, do not execute the following steps. Instead, restart step 2 from the beginning.
    d) Set the next field of to_q to NULL, the to_me field to the number of this CPU, and the to_stat field to TO_INPROGRESS
    e) Decrement the t_total field (and the t_nmgeng and t_nmgquad field, if appropriate based on the tocell's affinity) to account for the tocell being removed from the queue.
    f) Set the SPL to the level specified by to_spl.
    g) Release the t_mutex lock.
    h) Invoke the function specified by to_fcn, passing it to_arg as its first argument, and the state value (TO_NORM, TO_OFFL, or TO_OVLD) as its second argument.
    i) Acquire the t_mutex lock of the timeout_engine structure that the to_eng field points to. This may be different than the lock released two steps earlier if the tocell has been to_timeout()ed while its handler was running.
    j) If the to_flags field contains TO_DEFCB, repost the tocell:
        i) Remove the TO_DEFCB value from to_flags.
        ii) Set the to_stat field to TO_POSTING (for diagnostic purposes).
        iii) Perform the work outlined for to_timeout_eng() in a previous section (except do not acquire and release the t_mutex lock, since we already hold it in this case), with the to_me field as the specified engine. Note that this cannot possibly result in another round of deferred posting, since the to_stat field is not equal to TO_INPROGRESS.
        iv) Decrement the t_defcount field referred to by this tocell's to eng pointer.

TABLE 10-continued v) If we are holding the t_mutex lock for some other CPU, release it and acquire this CPU's t_mutex lock in order to be set up to remove the next tocell from this CPU's t_now list.
- k) Otherwise, if the to_flags field contains TO_DEFDEL, free up the tocell.
- l) Otherwise, set the to_stat field to TO_FIRED and, if we are holding the t_mutex lock for some other CPU, release it and acquire this CPU's t_mutex lock in order to be set up to remove the next tocell from this CPU's t_now list. This can happen if the tocell was subjected to a to_timeout() followed by a to_untimeout() while its handler was running. The to_timeout() can change the tocell's lock allegiance, and the to_untimeout() will cancel the deferred posting.
- m) If there are more than OVLD_cblen tocells on this CPU's t_now list, balance the load as described in a later section. OVLD_cblen defaults to 200. We do not select an adaptive scheme, since it has proven unnecessary thus far.
- n) If the rrupt_time_left() primitive (described later) indicates that we have used our quota of CPU time, and this CPU is not going offline, leave this "while" loop even if there are additional tocells on the t_now list.
- o) Otherwise, continue processing from the beginning of step 2.
3. Release this CPU's t_mutex lock, and return from the softclock() function.

Online/Offline Processing

The prior timeout mechanism takes no action when a CPU goes offline or comes back online, since the timeout data structures are global in scope and the next available CPU simply processes the tocell. However, the present node-aware version must be aware of CPUs going offline in order to avoid "stranding" tocells that were queued on a specific CPU's data structure 60. In addition, if there are any TO_NOMIGRATE tocells queued on a particular CPU's structure, then that CPU must be prevented from going offline (via EBUSY errno).

An attempt to offline a CPU goes through the following timeout-related steps:

TABLE 11

1. If the t_nmgeng field is nonzero, or if this CPU is the last online CPU on its node and the t_nmgquad field is nonzero, fail the offline request with EBUSY, and do not execute the following steps.
2. Set the TE_REFUSE flag in t_flags field to prevent more tocells from being added to this CPUs queues.
3. Acquire the global load-balancing lock(a global lock that is used to avoid deadlock situations that would otherwise arise when accessing more than one CPU's timeout data structures simultaneously).
4. If this is the last online CPU in the system, then system 10 is shutting down. Set the "dst_toeng" destination timeout_engine pointer to NULL, indicating that there is no place to put the tocells.
5. Otherwise, select a destination node and CPU:
   - a) If the current node has other CPUs online, pick the CPU from this node that has the fewest total tocells.
   - b) Otherwise, find the node with the fewest total tocells, and then pick the CPU from that node that has the fewest total tocells.
   - c) Set the "dst_toeng" pointer to the selected CPU's timeout_engine structure.
   - d) Acquire the selected CPU's t_mutex.
6. Acquire the to-be-offlined CPU's t_mutex. Note that we may already hold a selected CPU's t_mutex Deadlock is avoided because we hold the global load-balancing lock.
7. Release the global load-balancing lock.
8. Remove all tocells from the to-be-offlined CPU's timeout_engine structure. Set their global state to TO_OFFL and disposition them depending on their migration type as follows:
   - a) TO_MIGRATE: place the tocell on the selected CPU's queues using the procedure in step (4b) of the to_timeout() procedure. If there is no selected CPU, discard the tocells.

TABLE 11-continued

- b) TO_ERRMIGRATE: If the affinity type is TO_QUAD and the two CPUs are on the same node, place the tocell on the selected CPU's queues using the procedure in step (4b) of the to_timeout() procedure.
  Otherwise, invoke the tocell's to_fcn, passing to_arg as first parameter and TO_OFFL as the second parameter.
- c) TO_EVAPMIGRATE: If the affinity type is TO_QUAD and the two CPUs are on the same node, place the tocell on the selected CPU's queues using the procedure in step (4b) of the to_timeout() procedure.
  Otherwise, set the to_stat field to TO_NOQ.
- d) TO_NOMIGRATE: If the affinity type is TO_QUAD and the two CPUs are on the same node, place the tocell on the selected CPU's queues using the procedure in step (4b) of the to_timeout() procedure.
  Otherwise, we have an internal inconsistency, so panic the system.
9. Release the to-be-offlined CPU's t_mutex lock.
10. If there is a selected CPU, release its t_mutex lock.

When a CPU is brought online, it is taken through the following timeout-related steps:

TABLE 12

1. Set the CPU's t_tod_local field equal to todtick.
2. Set the CPU's t_tod_saved field to t_tod_local.
3. Acquire the CPU's t_mutex lock.
4. Clear the TE_REFUSE bit from the t_flags field.
5. Zero the t_total, t_nmgquad, t_nmgeng, t_defcount, t_ovldcnt, t_ovld_noeng_cnt, t_now.tq_count, and all of the t_buckets[i].tq_count field.
6. Release the CPU's t_mutex lock.

Load Balancing

Prior-art timeout mechanisms do not require load balancing, since there was only one queue data structure for all tocells. However, load balancing is desirable in the node-aware case, since it is possible for a single CPU to generate more timeouts than it can process.

The softclock( ) function checks for overload at the end of each pass through its tocell-handling loop. If it detects overload, it invokes the timeout_balance_load( ) function. This function uses a weighted loading measurement as follows:

$$OVLD\_rruptload\_weight * RRUPT\_LOAD(\ ) + OVLD\_cblen\_weight * t\_now.tq\_count$$

(RRUPT_LOAD( ) is defined in a following section.) Currently, the static value of 10 is used for OVLD_rruptload_weight and 1 for OVLD_cblen_weight. This static scheme has proven sufficient thus far, but a dynamic scheme might prove necessary in the future.

The timeout_balance_load( ) function is described in Table 13:

TABLE 13

1. Acquire the global load-balancing lock.
2. Select a destination node and CPU:
   - a) Find the node with the lowest weighted loading measurement, and then pick the CPU from that node that has the lowest weighted loading measurement.
   - b) Set the "dst_toeng" pointer to the selected CPU's timeout_engine structure.
3. If the overloaded and the selected CPU are the same, increment the t_ovld_noeng_cnt, release the global load-balancing lock, and return without executing the following steps. This can happen if all CPUs are overloaded.

TABLE 13-continued

4. Acquire the selected CPU's t_mutex and the overloaded CPU's t_mutex. Deadlock is avoided because the global load-balancing lock is held.
5. Release the global load-balancing lock.
6. Compute the number of tocells to be moved as half of the difference between the number on the t_now list of the overloaded CPU and the number on t_now list of the selected CPU. If this computed number is less than OVLD_cblen/OVLD_cbdelta, release locks and return without executing the following steps. The value of OVLD_cblen is 200, and that of OVLD_cbdelta is 2, for a ratio of 100. Dynamically-computed values have not yet proven necessary. This formula guarantees forward progress in the case of TO_MIGRATE tocells.
7. Increment the t_ovldcnt field of the source CPU.
8. Remove the computed number of tocells from the end of the overloaded CPU's t_now list. Set their global state to TO_OVLD and disposition them depending on their migration type as follows:
   a) TO_MIGRATE: place the tocell on the selected CPU's t_now queue using the procedure in step (4b) of the to_timeout() procedure.
   b) TO_ERRMIGRATE: If the affinity type is TO_QUAD and the two CPUs are on the same node, place the tocell on the selected CPU's t_now queue using the procedure in step (4b) of the to_timeout() procedure. Otherwise, leave the tocell on the overloaded CPU's queue.
   c) TO_EVAPMIGRATE: If the affinity type is TO_QUAD and the two CPUs are on the same node, place the tocell on the selected CPU's t_now queue using the procedure in step (4b) of the to_timeout() procedure. Otherwise, leave the tocell on the overloaded CPU's queue.
   d) TO_NOMIGRATE: If the affinity type is TO_QUAD and the two CPUS are on the same node, place the tocell on the selected CPU's t_now queue using the procedure in step (4b) of the to_timeout() procedure. Otherwise, leave the tocell on the overloaded CPU's queue.
9. Release the overloaded CPU's t_mutex lock and the selected CPU's t_mutex lock.

Remote Execution

Remote execution is a request for a specified function to be invoked, as soon as possible, possibly on a particular CPU or node, with up to three specified arguments. The conceptual difference between timeout and remote execution is that remote execution can be immediate, while timeout implies a delay of at least until the next clock tick. In particular, specifying a delay of 0 to to_timeout( ) is defined by standards to be equivalent to specifying a delay of 1.

The concept of timeout predated that of remote execution by several decades. The need to maintain source-level compatibility with the old timeout mechanism, combined with the existing implementation of this mechanism, made a combined implementation timeout and remote execution unattractive. Therefore, the two mechanisms are described separately here, but only because the present embodiments are distinct. Conceptually, the two mechanisms are substantially similar. The remote-execution mechanism, for example, could simply place tocells directly on the t_now list for immediate execution.

The following table shows the analogous components of the timeout and remote-execution subsystems:

TABLE 14

| Timeout | Remote Execution | Purpose |
| --- | --- | --- |
| tocell | rmt_callback_t | Data structure that tracks one request for deferred execution |
| to_ | rcb_ | Field-name prefix for per-request data structure. |
| timeout_engine | rmt_hdr_t | Data structure that tracks requests that have been posted to a particular CPU. |

TABLE 14-continued

| Timeout | Remote Execution | Purpose |
| --- | --- | --- |
| t_ | rmt_ | Field-name prefix for per-CPU data structure. |
| toc_qhead_t | (none) | Data structure that tracks requests that are to fire at a given time. |
| tq_ | (none) | Field-name prefix for toc_qhead_t. |
| to_create() | rmt_create() | Create a data structure to track one deferred-execution request. |
| to_destroy() | rmt_destroy() | Delete a data structure that tracks one deferred-execution request. |
| to_timeout() | rmt_callback() | Post a request for deferred execution. |
| to_untimeout() | (none) | Cancel a previous posting. |
| (none) | rmt_callback_done() | Allow rmt_callback() concurrent with handler execution. |
| todclock() | (none) | Function that keep global system time. |
| hardclock() | (none) | Function that keeps timeout execution synchronized to global system time. |
| softclock() | rmt_intr() | Function that invokes handlers. |

Overview of Remote-execution Data Structures

Figure 8:
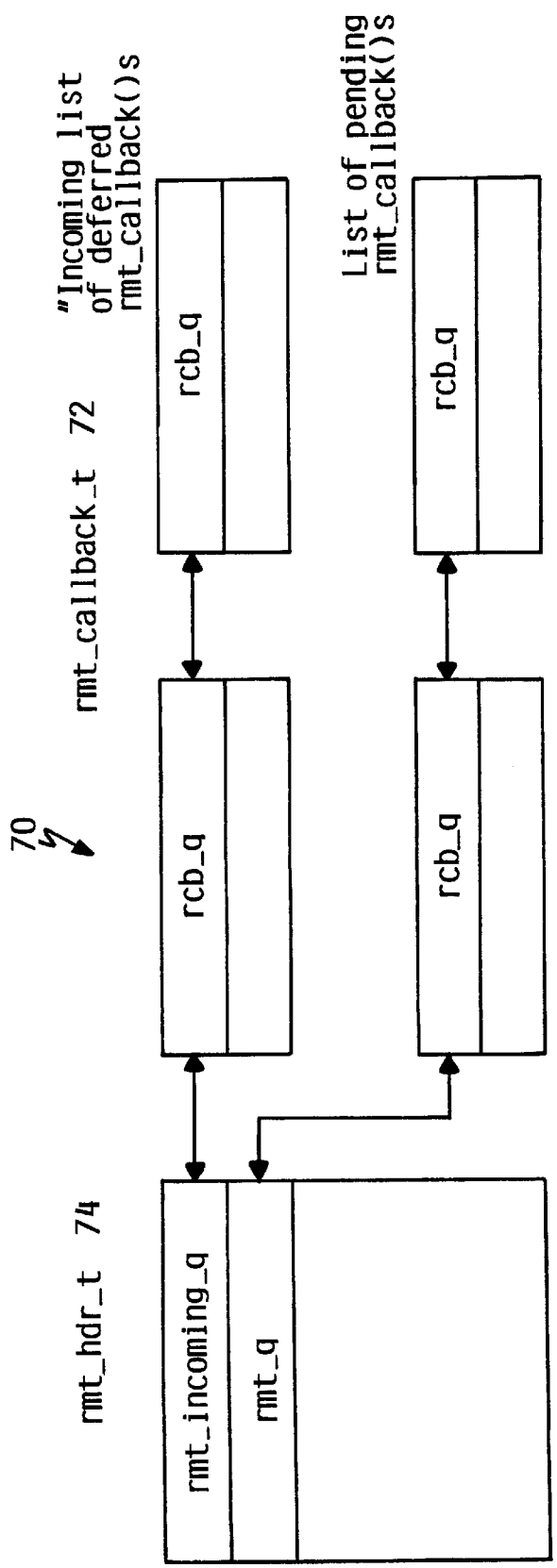
FIG. 8 is a block diagram of an overall data structure used in a remote execution mechanism in accordance with the invention.

Referring to FIG. 8, an overall data structure 70 for remote execution includes a rmt_callback_t structure 72 (analogous to tocell 64) and the rmt_hdr_t structure 74 (analogous to timeout_engine structure 66). Just as for the timeouts, there is one data structure 70 per CPU. Also just as for the timeouts, the double-ended arrows indicate a circular doubly-linked list.

The rmt_callback_t structures are placed directly on the rmt_q list by the rmt_callback( ) primitive, unless that rmt_callback_t's handler is currently running, in which case the callbacks are instead placed on the rmt_incoming_q list. Any rmt_callback_t structures on the rmt_q list have their handlers invoked (and are removed from the rmt_q) by rmt_intr( ). When a handler completes executing, it may return CALLBACK_DEFER, in which case rmt_intr( ) will place its rmt_callback_t into RCB_DEFERRED state and queue it onto an appropriate rmt_q list. Otherwise, if the rmt_callback_t has been placed in RCB_DEFCB by an rmt_callback( ) that executed while the handler was running, rmt_intr( ) removes it from its rmt_incoming_q and places it on the appropriate rmt_q list for later execution.

The Remote-execution Data Structures

The rmt_callback_t structure represents one request for a function to be invoked as soon as possible, possibly on some other CPU or node. FIG. 8 shows the most pertinent field, rcb_q. This and the other fields are defined as follows (note that they all have the "rcb_" prefix):

TABLE 14

| Field name | Definition |
| --- | --- |
| rcb_q | A pair of pointer fields used to arrange rmt_callback_ts in a circular doubly-linked list. |
| rcb_func | Handler function to execute. |
| rcb_arg1 | Second argument to rcb_func (first argument will be a pointer to this rmt_callback_t). |
| rcb_arg2 | Third argument to rcb_func. |
| rcb_arg3 | Fourth argument to rcb_func. |
| rcb_flags | Current state of rmt_callback_t, see below. |

TABLE 14-continued

| Field name | Definition |
|---|---|
| rcb_mutex | Lock that resolves races between rmt_intr(), rmt_callback(), and rmt_destroy. |
| rcb_hdl_eng | CPU that the handler is currently running on, or ANYENG if it is not currently executing. |
| rcb_quad | Desired node, or ANYQUAD if no preference. |
| rcb_eng | Desired CPU, or ANYENG if no preference. |
| rcb_spl | SPL that the handler was last started at. |
| rcb_set_spl | SPL last requested by the caller. |
| rcb_rh | Remote-execution header to use for deferred posting (roughly analogous to the to_me field in the tocell) (this field has a rmt_hdr_t structure). |
| rcb_quad_next | Desired node for deferred posting. |
| rcb_eng_next | Desired CPU for deferred posting. |
| rcb_spl_next | Desired SPL for deferred posting. |
| *rcb_last_callback | Return address for last call to rmt_callback() for diagnostic purposes. |
| *rcb_prev_callback | Return address for next-to-last call to rmt_callback() for diagnostic purposes. |
| rcb_last_callback_eng | CPU that last handler invocation ran on. |
| rcb_prev_callback_eng | CPU that next-to-last handler invocation ran no. |
| rcb_npost | Number of times that this rmt_callback_t has been posted via rmt_callback(). |
| rcb_ndefers | Number of times that this rmt_callback_t's handler has returned CB_DEFER to defer itself.. |

The rcb_flags field in Table 15 has the following values (note the "RCB_" prefixes, except for the "CB_" prefixed values that are used by other subsystems):

TABLE 16

| Value Class | Value Name | Definition |
|---|---|---|
| Current Affinity | CB_ENG | Don't leave the specified CPU |
| | CB_QUAD | Don't leave the specified node |
| | CB_QUAD | Don't leave the specified node. |
| | CB_GBL | Freely migrate. |
| Next Affinity | | Same values as for current affinity, but shifted up three bits. The current-affinity values apply to the current invocation of the handler, while the next-affinity values apply to a deferred rmt_callback() operation. |
| State | RCB_INACTIVE | Handler has completed, or has never been posted. |
| | RCB_WAITING | Queued, but not yet executing. |
| | RCB_EXECUTING | Handler currently running. |
| | RCB_DEFERRED | Handler deferred itself, and is awaiting further execution. |
| Deferred State | RCB_DEFNOT | There are no deferred operations awaiting completion of handler execution. |
| | RCB_DEFCB | An rmt_callback() operation has been deferred awaiting completion of handler execution. |
| | RCB_DEFDEL | An rmt_destroy() operation has been deferred awaiting completion of handler execution. |
| | RCB_DEFDONE | An rmt_callback_done() operation has executed since the handler started executing, so that rmt_callback() invocations on this rmt_callback_t from outside the handler are now legal. |
| Miscellaneous | RCB_FLEXSPL | Execute the handler at the SPL that the corresponding rmt_callback() was run at. |
| | RCB_NEXTED | The rmt_next_ptr() primitive was used to place this callback on a list, so that it is now illegal to return CB_DEFER from the handler. |

The rmt_hdr_t structure 74 in FIG. 8 is analogous to the per-CPU timeout_eng structure 66 in FIG. 5. FIG. 8 shows its most pertinent field, rmt_q. This and the structure's other fields begin with the "rmt_" prefix and are as follows:

TABLE 17

| Field name | Definition |
|---|---|
| rmt_incoming_q | Circular doubly-linked list of rmt_callback_t structures that have been scheduled via rmt_callback() while their handler is still running, and are hence deferred until handler completion. This list is strictly for diagnostic purposes. |
| rmt_q | Circular doubly-linked list of rmt_callback_t structures that have been scheduled via rmt_callback() and whose handlers are not currently running. Analogous to t_now. |
| rmt_flags | Contains the RMT_OFFLINE flag that prevents rmt_callback() from posting to this CPU. |
| rmt_engno | The CPU corresponding to this structure |
| rmt_mutex | Lock that guards this structure and all lists emanating from it, analogous to t_mutex. |
| rmt_callbacks_waiting | Number of callbacks waiting on this structure. |
| rmt_ncallbacks | Cumulative number of callbacks registered on this CPU. |
| rmt_ndispatches | Cumulative number of callbacks whose handlers have run on this CPU. |
| rmt_nincoming | Number of callbacks on the rmt_incoming_q awaiting their handlers'completions. |
| rmt_ovldcnt | Number of times that load balancing has been performed on this CPU |
| rmt_ovld_noeng_cnt | Number of times that load balancing has been attempted, but failed due to this being the least-loaded CPU. |

Selected Operations on Remote-execution Data Structures

Although there are many similarities between the posting and dispatching of timeouts and remote executions, there are some important differences. The following sections give step-by-step procedures for the rmt_callback( ), rmt_intr( ), rmt_callback_done( ), online/offline, and load-balancing operations.

Scheduling a Function

The rmt_callback( ) primitive is similar to the to_timeout( ) primitive, but there is no future events buckets array. The rmt_callback_t structures are placed directly on the rmt_q list corresponding to the selected CPU (or onto the rmt_incoming_q list when the rmt_callback( ) is invoked on an rmt_callback_t whose handler is executing). The procedure rmt_callback( ) goes through is as follows:

TABLE 18

1. Acquire the rcb_mutex lock.
2. If the RCB_FLEXSPL flag is set, set variable "s" to the current SPL, otherwise set it to the rcb_set_spl field.
3. If "s" is equal to SPL0, set it to SPL1.
4. If this rmt_callback is RCB_INACTIVE, we can queue the callback immediately as follows:
   a) Select a CPU for the rmt_callback as follows:
      i) If a particular CPU is specified, select that CPU and acquire its rmt_mutex (to avoid races, the rmt_mutex must be acquired before checking the CPU, and dropped if the CPU is inappropriate).
      ii) Otherwise, if a particular node is specified or if the current node is permitted, select the least-loaded CPU on that node and acquire its rmt_mutex (to avoid races, the rmt_mutex must be acquired before checking the CPU, and dropped if the CPU is inappropriate). Ignore CPUs with RMT_OFFLINE set. The load is computed as (OVLD_rruptload weight * RRUPT_LOAD() + OVLD_cblen_weight * rmt_callbacks_waiting), similar to the load-balancing case of timeouts.

TABLE 18-continued iii) Otherwise:
  a) Select the node with the least load, computing each node's load as the sum of the (OVLD_rruptload_weight * RRUPT_LOAD() + OVLD_cblen_weight * rmt_callbacks_waiting) for each CPU. Ignore nodes whose CPUs all have RMT_OFFLINE set.
  b) Select the least-loaded CPU on that node and acquire its rmt_mutex. Again, the load is computed as (OVLD_rruptload_weight * RRUPT_LOAD0 + OVLD_cblen_weight * rmt_callbacks_waiting). Ignore nodes whose CPUs all have RMT_OFFLINE set.
  iv) If no suitable CPU is available (for example, if a particular node was specified and all CPUs on that node are offline), then release rcb_mutex and return failure (do not execute the following steps).
b) Set the rcb_prev_callback field to the rcb_last_callback field, the rcb_last_callback field to rmt_callback()'s return address, the rcb_prev_callback_eng field to the rcb_last_callback field, the rcb_last_callback_eng field to this CPU's number, and increment the rcb_npost field.
c) Enqueue the rmt_callback_t as follows:
  i) Substitute the affinity argument and RCB_WAITING into the rcb_flagsfield.
  ii) Set the rcb_quad field to the node argument, the rcb_eng field to the eng (CPU) argument, and the rcb_spl field to the "s" variable set above.
  iii) Append the rmt_callback_t to the rmt_q list.
  iv) Increment the rmt_ncallbacks field, and, if the result is 1 (the list was empty), release the rmt_mutex lock and send a software interrupt to invoke the rmt_intr() function. Otherwise, if the result was not 1, simply release the rmt_mutex lock.
d) Release the rcb_mutex lock and return success (do not execute the following steps).
5. Otherwise, the handler is executing, and we must defer the rmt_callback() operation as follows:
  a) Select a CPU and acquire its rmt_mutex as in step (4a) above. If no CPU is available, release the rcb_mutex lock and return failure (and not execute the following steps).
  b) Set the rcb_prev_callback field to the rcb_last_callback field, the rcb_last_callback field to rmt_callback()'s return address, the rcb_prev_callback_eng field to the rcb_last_callback field, the rcb_last_callback_eng field to this CPU's number, and increment the rcb_npost field.
  c) Increment the rmt_nincoming field.
  d) Append the rmt_callback_t to the rmt_incoming_q list of deferred rmt_callback_t structures.
  e) Release the rmt_mutex lock.
  f) Save away the rmt_callback() parameters for later use by rmt_intro(): set rcb_quad_next to the node parameter rcb_eng_next to the eng parameter, rcb_rh to point to the selected CPU's rmt_hdr_t structure, and rcb_spl_next to the "s" variable.
  g) Substitute the aff parameter into the next-affinity portion of the rcb_flags, and substitute RCB_DEFCB into rcb_flags.
  h) Release rcb_mutex and return success.

Invoking a Handler

The rmt_intr( ) primitive invokes handlers for previously-posted rmt_callbacks. It is invoked by software interrupt, and runs at SPL1.

TABLE 19

1. While there are rmt_callback_t structures on the rmt_q list, repeat the following steps:
  a) Acquire the rmt_mutex lock, remove the first rmt_callback_t from the rmt_list, decrement the rmt_callbacks_waiting field, increment the rmt_ndispatches field, and release the rmt_mutex lock.
  b) Substitute RCB_EXECUTING into the rcb_flags field and set the rcb_hdl_eng to the current CPU's number.
  c) If rcb_spl is not equal to SPL1, set the SPL to that specified by rcb_spl.

TABLE 19-continued d) Invoke the function pointed to by rcb_func, passing it a pointer to the rmt_callback_t along with rcb_arg1, rcb_arg2, and rcb_arg3.
  e) Restore the SPL to SPL1 if needed.
  f) If the function pointed to by rcb_func returned CALLBACK_DEFER, then defer the rmt_callback_t as follows:
    i) Substitute RCB_DEFERRED into rcb_flags.
    ii) Set rcb_hdl_eng to ANYENG and increment the rcb_ndefers field.
    iii) Select a CPU (and acquire its rmt_mutex) using the procedure laid out in step (4a) of the rmt_callback() procedure, using the affinity field, the rcb_quad field, and the rcb_eng field for the affinity, node, and CPU arguments, respectively. If no CPU was found, select this CPU (and acquire its rmt_mutex).
    iv) Append the rmt_callback_t to the selected CPU's rmt_q and increment its rmt_callbacks waiting field.
    v) If the selected CPU is not this CPU, release its rmt_mutex and send a software interrupt to cause rmt_intr() to be invoked. Otherwise, simply release rmt_mutex.
  g) Otherwise, the function returned CALLBACK_DONE:
    i) Acquire the rmt_callback_t structure's rcb_mutex and handle any deferred operations based on the rmt_flags field as follows:
      a) RCB_DEFCB: repost the rmt_callback_t using the "rmt_callback_deferred" procedure outlined later in this section.
      b) RCB_DEFDEL: Substitute RCB_DEFNOT and RCB_INACTIVE into the rmt_flags for diagnostic purposes, release the rmt_callback_t's rcb_mutex, and free it up.
      c) RCB_DEFDONE or RCB_DEFNOT: Substitute RCB_DEFNOT and RCB_INACTIVE into the rmt_flags, set the rcb_hdl_eng field to ANYENG, and release the rcb_mutex.
  h) If there are more than OVLD_cblen rmt_callback_t structures queued for this CPU, balance the load as described in a later section. OVLD_cblen is statically defined to 200, a dynamic scheme has not yet proven necessary.
  i) If the rrrupt_time_left() primitive (see later section) determines that we have used too much time on this CPU, and this CPU is not in the process of going offline, return. Otherwise, repeat from step 1.

The steps in the rmt_callback_deferred procedure are as follows:
1. Acquire the destination CPU's rmt_mutex (obtained from the rcb_rh field).
2. Decrement the destination CPU's rmt_nincoming field, remove the rmt_callback_t from the rmt_incoming_q, and substitute RCB_DEFNOT into the rcb_flags field.
3. Substitute RCB_WAITING and the next-affinity section of the rcb_flags into rcb_flags.
4. Set rcb_quad to rcb_next_quad, rcb_eng to rcb_next_eng, and rcb_spl to rcb_next_spl.
5. Insert the rmt_callback_t into the destination CPU's rmt_q list.
6. Increment the rmt_ncallbacks field and the rmt_callbacks_waiting field. If the latter results in 1, send a software interrupt to the destination CPU to start up rmt_intr() after releasing rmt_mutex. Otherwise, just release rmt_mutex.

The rmt_callback done( ) Operation

This function allows code outside of a given rmt_call_t structure's handler to repost the handler (using rmt_callback( ) while the current instantiation of the handler is still executing. Among other things, it substitutes RCB_DEFDONE into the rcb_flags field.

Online/Offline Processing

As with the timeout mechanisms, remote execution must handle offline and online events to avoid stranding rmt_callback_t structures. However, since there is no concept of required time delay, rmt_callback_t structures are disposed of by invoking their handlers on the CPU before it goes offline.

Offlining a CPU is handled as follows:

TABLE 20

1. Acquire the CPU's rmt_mutex lock.
2. Set the RMT_OFFLINE bit in the rmt_flags field in order to prevent any further rmt_callback_t structures from being posted to this CPU
3. Release the CPU's rmt_mutex.
4. Set the SPL to SPL1 to prepare the environment for calls to rmt_intr().
5. While there are rmt_callback_t structures queued for this CPU, invoke rmt_intr().
6. Restore the SPL.

Onlining a CPU is handled as follows:

TABLE 21

1. Acquire the CPU's rmt_mutex.
2. Remove the RMT_OFFLINE bit from the rmt_flags field.
3. Release the CPU's rmt_mutex.

Load Balancing

Just as with node-aware timeouts, load balancing is required for node-aware remote execution, since it is possible for a single CPU to post more rmt_callback_t structures than it can process.

The rmt_intr( ) function checks for overload at the end of each pass through its rmt_callback_t-handling loop. If it detects overload, it invokes the rmt_load_balance( ) function. This function uses a weighted loading measurement as follows:

$$OVLD\_rruptload\_weight * RRUPT\_LOAD( ) + OVLD\_cblen\_weight * rmt\_callbacks\_waiting$$

Currently, the static value of 10 is used for OVLD_rruptload_weight and 1 for OVLD_cblen_weight. This static scheme has proven sufficient thus far, but a dynamic scheme might prove necessary in the future. The RRUPT_LOAD( ) primitive is described in the following section on interrupt load.

The rmt_load_balance( ) function goes through the following steps:

TABLE 22

1. Acquire the global load-balancing lock.
2. Select a destination node and CPU:
   a) Otherwise, find the node with the lowest weighted loading measurement, and then pick the CPU from that node that has the lowest weighted loading measurement.
   b) Set the "dst_rmtp" pointer to the selected CPU's rmt_hdr_t structure.
3. If the overloaded and the selected CPU are the same, increment the rmt_ovld noeng_cnt, release the global load-balancing lock, and return without executing the following steps. This can happen if all CPUs are overloaded.
4. Acquire the selected CPU's rmt_mutex and the overloaded CPU's rmt_mutex. Deadlock is avoided because we hold the global load-balancing lock.
5. Release the global load-balancing lock.
6. Compute the number of rmt_callback_t structures to be moved as half of the difference between the rmt_callbacks_waiting of the overloaded CPU and that of the selected CPU. If this computed number is less than OVLD_cblen/OVLD_cbdelta, release locks and return without executing the following steps. The value of OVLD_cblen is 200, and that of OVLD_cbdelta is 2, for a ratio of 100. Dynamically-computed values have not yet proven necessary. This formula guarantees forward progress in the case of CB_GBL rmt_callback_t structures, and is a key point of this invention.
7. Increment the rmt_ovldcnt field of the source CPU.

TABLE 22-continued

8. Remove the computed number of rmt_callback_t structures from the overloaded CPU's rmt_callbacks_waiting structure. Set their global state to TO_OVLD and disposition them depending on their affinity type as follows:
   a) CB_GBL: place the tocell on the selected CPU's rmt_callbacks_waiting queue using the procedure in step (4c) of the rmt_callback() procedure.
   b) CB_QUAD: If the two CPUs are on the same node, place the tocell on the selected CPU's rmt_callbacks_waiting queue using the procedure in step (4c) of the rmt_callback() procedure. Otherwise, leave the rmt_callback_t on the overloaded CPU's queue.
   c) CB_ENG: Leave the tocell on the overloaded CPU's queue.
9. Add the number of rmt_callback_t structures transferred to the selected CPU's rmt_callbacks_waiting, and subtract it from the overloaded CPU's rmt_callbacks_waiting.
10. Release the overloaded CPU's rmt_mutex lock and the selected CPU's rmt_mutex lock.
11. If any rmt_callback_t structures were actually transferred, send a software interrupt to the destination CPU in order to start up rmt_intr().

Load Measurement and Throttling

Traditionally, interrupts have been executed at absolute higher priority than have processes. In the larger, more complex systems found at the high end, this absolute priority causes problems such as process starvation. Some components, though implemented as processes or as lower-priority interrupts, are nonetheless critical to overall system health. It is therefore unacceptable to allow these components to be starved by a flood of "high-priority" interrupts.

Instead, interrupt priority is treated as a hint that the corresponding handler needs low latency under light load. Under heavy load, interrupts are throttled as needed to allow all components of the system to get their fair share of CPU time.

Figure 9:
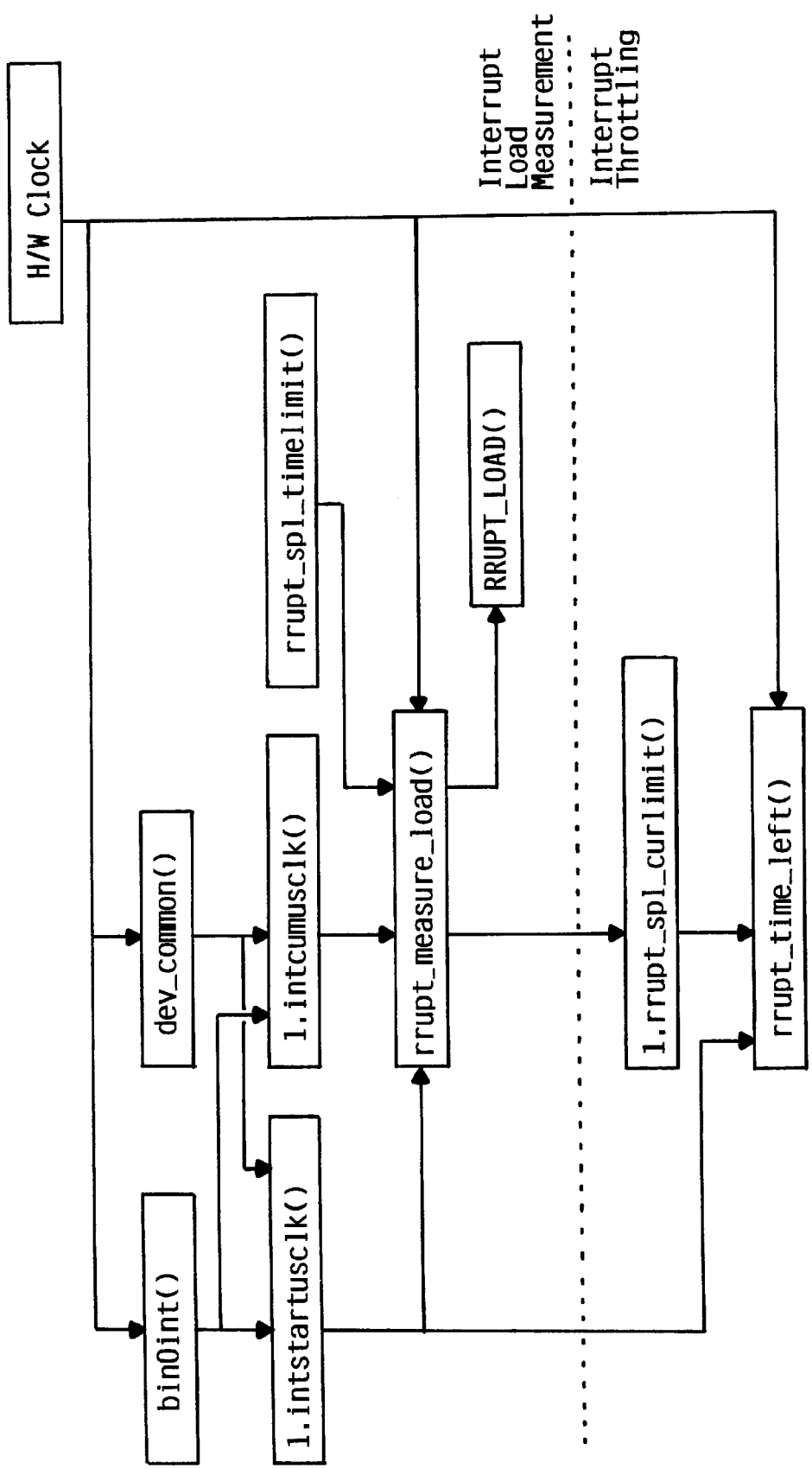
FIG. 9 is a block diagram of a process for measuring interrupt loads and for throttling interrupts

This throttling is implemented by measuring the interrupt load and by providing primitives that allow an interrupt handler to determine when it has exhausted its fair share of CPU time. The data flow through this process is shown in FIG. 9.

The portion of the diagram above the dotted line describes interrupt load measurement, and the portion below the dotted line describes interrupt throttling.

Interrupt Load Measurement

All data structures described in this section are replicated on a per-CPU basis, so that the notion of interrupt load is strictly per-CPU. There is no explicit notion of overall system interrupt load.

The current interrupt nesting level is maintained in I.intnesting. The handler start times are maintained in an array named I.intstartusclk[ ], and the cumulative handler times are maintained in an array named I.intcumusclk[ ]. These values are maintained by interrupt dispatch functions.

The rrupt_measureload( ) function takes the cumulative time spent in interrupt along with the time so far in the current interrupt and computes the maximum allowable times for each possible priority of interrupt handler. These maximum times are placed in the I.rrupt_spl_curlimit[ ] array.

The rrupt_measure_load( ) function uses the following steps to compute the values in this array:

TABLE 23

1. Determine the fraction of time spent in interrupts during the last 10-millisecond clock-tick interval. RRUPT_FRACTION( ) converts this fraction to a number from 0 to 255.

TABLE 23-continued

2. Use RRUPT_FILT_LOAD( ) to compute a digitally filtered interrupt load based on the time series of interrupt-time fractions for the preceding clock-tick intervals. The current measurement is weighted by 1/16 and the previous filter output is weighted by 15/16. This digitally filtered interrupt load is recorded in a per-CPU data structure so that it may be retrieved by the RRUPT_LOAD( ) primitive used by the timeout and remote-execution load balancing functions.
3. Use the filtered interrupt load to compute the interrupt time limits (placed into the I_rrupt_spl_curlimit[ ] array) from the nominal interrupt time limits obtained from rrupt_spl_timelimit[ ], using the equation:

$$t_c = t_n \left(1 - \frac{l_c - l_a}{l_t - l_a}\right)$$

where $t_c$ is the interrupt time limit to use for the current (upcoming) clock tick period, $t_n$ is the nominal interrupt time limit, $l_c$ is the current filtered load, $l_a$ is the desired average load (145 in ptx4.4), and $l_t$ is the threshold load (161 in ptx4.4). This equation can produce negative numbers, but the implementation of the rrupt_time_left( ) primitive has the effect of clamping it to zero. Note that both arrays are indexed by interrupt priority rather than by interrupt nesting level.
Note that I_rrupt_spl_curlimit[0] is not updated, since it controls the duration of process rather than interrupt execution. Instead, this value is initialized from rrupt_spl_timelimit[ ] at boot time and left alone subsequently.

Figure 10:
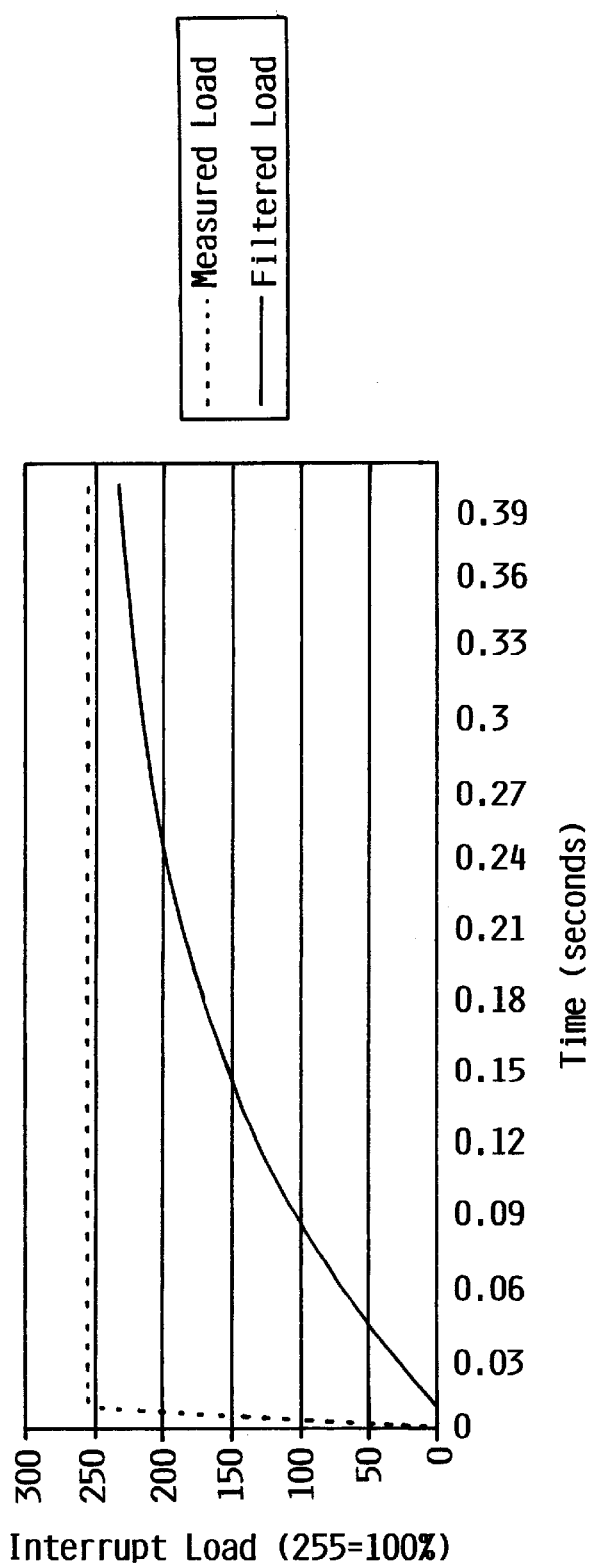
FIG. 10 is chart of the step response of a filtered interrupt load.

The step response of the digital filter against time in seconds is as shown in FIG. 10.

The measured load is the fraction of time spent in an interrupt handler during the preceding clock tick, expressed as parts of 255 (so that a value of 255 indicates that 100% of the time was spent in interrupt). The filtered load is the value computed in step 3 above, again expressed as parts of 255.

Figure 11:
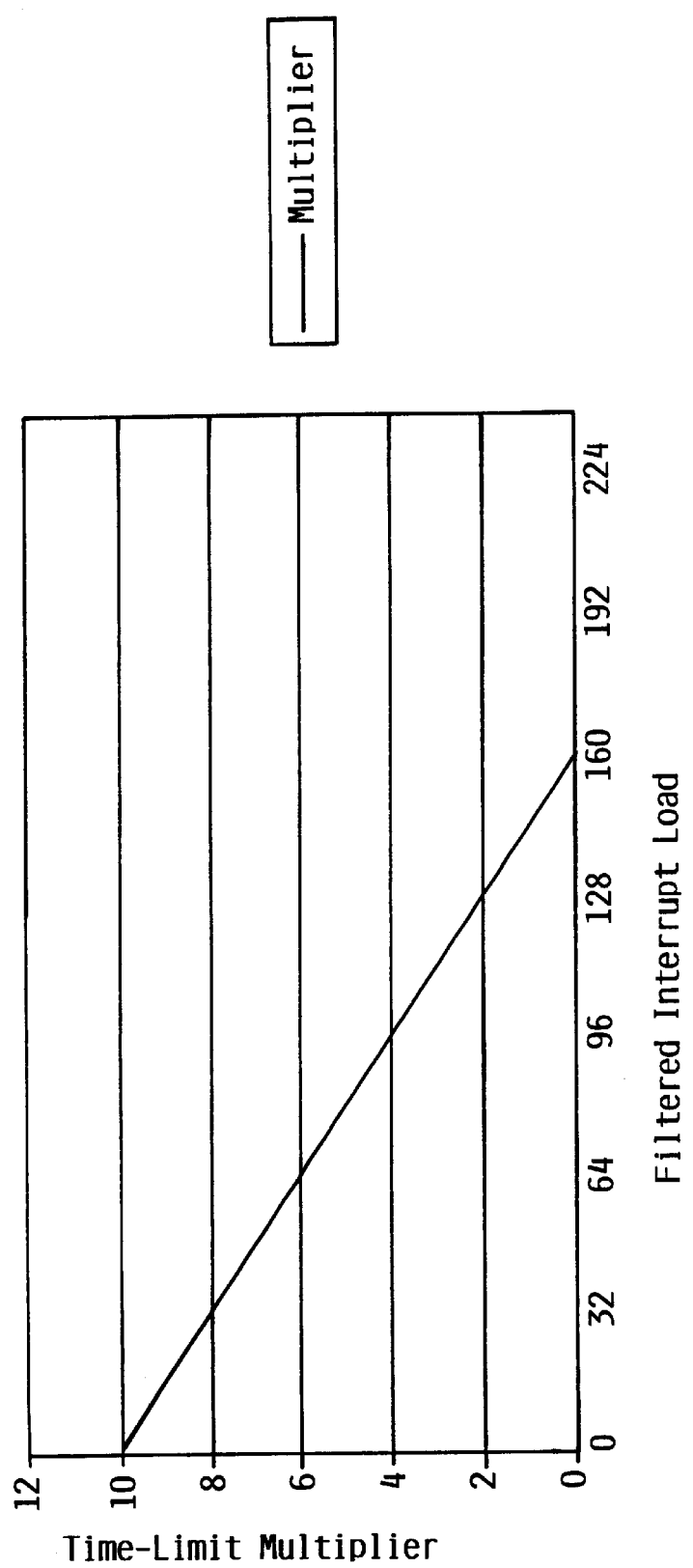
FIG. 11 is a chart of the response of an adjustment equation to the range of possible filtered loads.

The response of the adjustment equation to the range of possible filtered loads (taking the clamping action of rrupt_time_left( ) into account) is shown in FIG. 11.

Note that an interrupt handler is required to do at least one unit of work even if rrupt_time_left( ) immediately returns zero. This is necessary to ensure forward progress.

The overall effect is that as the interrupt load rises, the amount of time that an interrupt handler is permitted to run decreases. If the handler still has work to do once its time expires, it may use the rmt_callback( ) remote-execution primitives to reschedule that work to some other CPU or to a later point in time, depending on the relative loadings of the various CPUs.

Interrupt Throttling

The rrupt_time_left( ) primitive returns the amount of additional time that the caller may spend executing on the current CPU. If the filtered interrupt load is above a threshold, then rrupt_time_left( ) returns zero. Otherwise, it computes the amount of time spent in the current interrupt handler, subtracts this from the limit taken from I_rrupt_spl_curlimit[ ] array, and returns the result.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A shared memory multiprocessor computer having an operating system, the computer comprising:
   multiple processors;
   shared memory accessible by the processors;
   for each of the processors, an associated data structure stored in shared memory for scheduling the execution of specified functions by the processor; and
   a scheduling function stored in shared memory and responsive to a request by a requesting processor to add a specified function to a receiving processor's data structure, wherein the scheduling function selects the receiving processor and adds the specified function to the data structure of the receiving processor.

2. The multiprocessor computer of claim 1 wherein the computer is a non-uniform memory access (NUMA) computer having multiple processor nodes, each node having at least one processor and shared memory, a data structure and its associated processor being located on the same node.

3. The multiprocessor computer of claim 1 wherein the scheduling function is responsive to a request by a processor to add the specified function to the data structure of a processor other than the requesting processor.

4. The multiprocessor computer of claim 1 wherein the multiprocessor computer includes multiple nodes each of which has multiple processors, and wherein the scheduling function is responsive to a request by a processor to add the specified function to the data structure of a processor on a specified node.

5. The multiprocessor computer of claim 1 including a scheduling function that is responsive to a request by a processor to remove the specified function from the data structure of a processor.

6. The multiprocessor computer of claim 1 including a scheduling function that is responsive to a request by a processor to remove the specified function from the data structure of a processor other than the requesting processor.

7. The multiprocessor computer of claim 1 including a lock for each data structure which is acquired by a processor for access to the data structure.

8. A shared memory multiprocessor computer having multiple nodes and an operating system, the computer comprising:
   multiple processors on each node;
   shared memory accessible by the processors;
   for each of the processors, an associated data structure stored in shared memory for scheduling the execution of specified functions by the processor; and
   a scheduling function stored in shared memory and responsive to a request by a requesting processor to add a specified function to the data structure of a receiving processor that has the least load on a specified node, wherein the scheduling function selects the receiving processor, including determining that the receiving processor has the least load on the specified node, and adds the specified function to the data structure of the receiving processor.

9. A shared memory multiprocessor computer having an operating system, the computer comprising:
   multiple processors;
   shared memory accessible by the processors;
   for each of the processors, an associated data structure stored in shared memory for scheduling the execution of specified functions by the processor, the data structure comprising first and second data structures, the first data structure having a first field containing a list of second data structures identifying specified functions to be immediately executed by the processor and the second data structure having a first field identifying the first data structure for association and a second field identifying a specified function for execution; and a scheduling function stored in shared memory and responsive to a request by a processor to add a specified function to a processor's associated data structure.

10. The multiprocessor computer of claim 9 wherein the first data structure includes a second field for maintaining acount of second data structures associated with the first data structure.

11. The multiprocessor computer of claim 9 wherein the second data structure contains:

a third field for specifying a subset of CPUs on which the associated function can execute; and a fourth field describing action to be taken if the CPUs specified in the second field meet specified criteria.

12. The multiprocessor computer of claim 11 where the specified criteria include that the CPUs are not currently available, are overloaded, or there has been a request to render the last CPU in the subset incapable of executing the function.

13. The multiprocessor computer of claim 9 wherein the first data structure contains multiple second fields each containing a list of second data structures identifying specified functions to be executed at later points in time by the processor.

14. A shared memory multiprocessor computer having an operating system, the computer comprising:

multiple processors;

shared memory accessible by the processors;

for each of the processors, an associated data structure stored in shared memory for scheduling the execution of specified functions by the processor; and a scheduling function stored in shared memory and responsive to a request by a processor to add a specified function to a processor's data structure, wherein the function stored in memory is a timeout function for deferring the execution of a specified function to a later time.

15. A shared memory multiprocessor computer having an operating system, the computer comprising:

multiple processors;

shared memory accessible by the processors;

for each of the processors, an associated data structure stored in shared memory for scheduling the execution of specified functions by the processor; and a scheduling function stored in shared memory and responsive to a request by a processor to add a specified function to a processor's data structure, wherein the function stored in memory is a remote execution function for immediately executing the specified function.

16. In a shared memory multiprocessor computer having an operating system, a method of scheduling execution of a specified function, the method comprising the following steps:

storing in shared memory for each processor an associated data structure for scheduling the execution of a specified function by the processor;

storing in the shared memory a scheduling function; and in response to a request by a requesting processor, adding the specified function to the data structure of a receiving processor, wherein the scheduling function selects the receiving processor and adds the specified function to the receiving processor's data structure.

17. The method of claim 16 wherein the adding step includes adding the specified function to the data structure of a processor other than the requesting processor.

18. The method of claim 16 wherein the multiprocessor computer includes a multiple of nodes each of which has multiple processors, and wherein the adding step comprises adding the specified function to the data structure of a specified processor on a specified node.

19. The method of claim 18 wherein the adding step comprises adding the specified function to the data structure of a processor that has the least load on the specified node.

20. The method of claim 16 including, in response to a request by a processor, removing the specified function from the data structure of a processor.

21. The method of claim 16 including, in response to the request of a processor, removing the specified function from the data structure of a processor other than the requesting processor.

22. A computer-readable medium having stored therein instructions for performing the steps of claim 16.

23. The method of claim 16 including, in response to a request that a processor go offline, moving the specified function from the processor's data structure to the data structure of another processor.

24. The method of claim 16 including, in response to a request that a processor go offline, invoking the specified function but passing the specified function an error indication.

25. The method of claim 16 including, in response to a request that a processor go offline, refusing the request.

26. The method of claim 16 including:

determining if a measured load on a first processor exceeds a threshold; and if so, moving one or more of the specified functions to the data structure of a second processor whose load does not exceed the threshold.

27. In a shared memory multiprocessor computer having a multiple of nodes, each of which has multiple processors, and an operating system, a method of scheduling execution of a specified function, the method comprising the following steps:

storing in shared memory for each processor an associated data structure for scheduling the execution of a specified function by the processor;

storing a scheduling function in the shared memory;

in response to a request by a requesting processor, adding the specified function to the data structure of a receiving processor, wherein adding comprises selection of the receiving processor by the scheduling function and addition of the specified function to the data structure of the receiving processor by the scheduling function; and in response to a request that the receiving processor go offline, moving the specified function to a transferee processor on the same node as the receiving processor going offline, wherein moving comprises the scheduling function selecting the transferee processor from among processors on the node and adding the specified function to the data structure of the transferee processor.

28. In a shared memory multiprocessor computer having an operating system, a method of scheduling execution of a specified function, the method comprising the following steps:

storing in shared memory for each processor an associated data structure for scheduling the execution of a specified function by the processor;

storing in the shared memory a scheduling function; and in response to a request by a requesting processor, adding the specified function to the data structure of a receiving processor, wherein adding comprises selection of the receiving processor by the scheduling function and addition of the specified function to the data structure of the receiving processor by the scheduling function, and wherein the specified function is referenced by a data structure and the adding step is deferred until the specified function invoked previously on behalf of the data structure finishes executing.

29. In a shared memory multiprocessor computer having an operating system and shared memory, a method of scheduling execution of a specified function, the method comprising the following steps:

storing in shared memory for each processor an associated data structure for scheduling the execution of a specified function by the processor;

storing in the shared memory a scheduling function;

determining if a measured load on a first processor exceeds a threshold; and if so, moving one or more specified functions to the data structure of a second processor whose measured load does not exceed the threshold, wherein the scheduling function selects the second processor based on a calculation that the second processor's measured load does not exceed the threshold and adds the specified functions to the data structure of the second processor.

30. In a shared memory multiprocessor computer having an operating system and shared memory, a method of scheduling execution of a specified function, the method comprising:

storing in shared memory for each processor an associated data structure for scheduling the execution of a specified function by the processor;

determining if a measured load on a first processor exceeds a threshold, wherein the measured load is based at least in part on a fraction of time that a CPU spends executing interrupt handlers; and if so, moving one or more specified functions to the data structure of a second processor whose measured load does not exceed the threshold.

31. A shared memory multiprocessor computer having multiple nodes, the computer comprising:

multiple processors on each node;

shared memory on each node;

for each node, an associated data structure stored in shared memory for scheduling the execution of specified functions by the processors on the node; and a scheduling function stored in shared memory and responsive to a request by a processor to add a specified function to a node's data structure, wherein the scheduling function selects a specific node and adds the specified function to the data structure of the selected node.

* * * * *